US012638574B2

(12) United States Patent (10) Patent No.: US 12,638,574 B2
Svendsen et al. (45) Date of Patent: May 26, 2026

(54) DISTANCE MEASUREMENT

(71) Applicant: NOKIA TECHNOLOGIES OY,
Espoo (FI)

(72) Inventors: Simon Svendsen, Aalborg (DK); Jan Torst Hviid, Klarup (DK); Poul Olesen, Støvring (DK)

(73) Assignee: NOKIA TECHNOLOGIES OY,
Espoo (FI)

( * ) Notice: Subject to any disclaimer, the term of this patent is extended or adjusted under 35 U.S.C. 154(b) by 405 days.

(21) Appl. No.: 18/339,636

(22) Filed: Jun. 22, 2023

(65) Prior Publication Data

US 2023/0417898 A1 Dec. 28, 2023

(30) Foreign Application Priority Data

Jun. 22, 2022 (EP) ..................................... 22180293

(51) Int. Cl.
*G01S 13/82* (2006.01)
(52) U.S. Cl.
CPC .................................. *G01S 13/82* (2013.01)
(58) Field of Classification Search
CPC . H04W 56/006; H04W 56/009; H04W 64/00;
H04W 56/00; H04W 24/10;
(Continued)

(56) References Cited

U.S. PATENT DOCUMENTS 5,982,324 A * 11/1999 Watters ................... G01S 5/009
342/357.29
11,233,544 B1 * 1/2022 Pon ...................... H04B 7/0697
(Continued)

FOREIGN PATENT DOCUMENTS

| WO | WO 02/063327 A2 | 8/2002 |
| WO | WO 2021/177866 A1 | 9/2021 |
| WO | WO 2021/229026 A1 | 11/2021 |

OTHER PUBLICATIONS

"3rd Generation Partnership Project; Technical Specification Group Radio Access Network; Study on scenarios and requirements of in-coverage, partial coverage, and out-of-coverage NR positioning use cases (Release 17)", 3GPP TR 38.845 v17.0.0, (Sep. 2021), 16 pages.

(Continued)

*Primary Examiner* — Olumide Ajibade Akonai
(74) *Attorney, Agent, or Firm* — ALSTON & BIRD LLP

(57) ABSTRACT

An apparatus is provided that includes means for obtaining a total delay error that when added to a reference time equivalent to a reference distance between first and second antennas equals a difference between a transmission time of a signal sent via the first antenna and a reception time of the signal received via the second antenna; means for measuring a frequency-variable first delay associated with reflection of a signal from a frequency-variable complex impedance of the first antenna; means for measuring a frequency-variable second delay associated with reflection of a signal from a frequency-variable complex impedance of the second antenna; means for estimating a first portion of the total delay error associated with the first antenna in dependence upon at least the first delay; and means for estimating a second portion of the total delay error associated with the second antenna in dependence upon at least the second delay.

20 Claims, 7 Drawing Sheets

(58) Field of Classification Search
CPC ............. H04W 56/001; H04W 56/003; H04W
56/004; H04W 88/085; H04W 72/541;
H04W 24/02; H04W 56/0045; H04W
74/002; H04W 72/0453; H04W 72/21;
G01S 11/08; G01S 5/021; G01S 13/08;
G01S 7/40; G01S 5/0018; G01S 5/0009;
G01S 19/27; G01S 5/0036; H01Q 21/00;
H04B 7/0617; H04B 7/0671; H04B
7/0676
See application file for complete search history.

(56) References Cited

U.S. PATENT DOCUMENTS

| | | |
|---|---|---|
| 2017/0085398 A1 | 3/2017 | Liu |
| 2017/0212210 A1 | 7/2017 | Chen et al. |
| 2019/0349078 A1 | 11/2019 | Chen et al. |
| 2021/0105076 A1 | 4/2021 | Nielsen |
| 2022/0272757 A1* | 8/2022 | Liu .................... H04W 74/002 |
| 2023/0095643 A1 | 3/2023 | Svendsen et al. |

OTHER PUBLICATIONS

"3rd Generation Partnership Project; Technical Specification Group Services and System Aspects; Service requirements for cyber-physical control applications in vertical domains; Stage 1 (Release 17)", 3GPP TS 22.104 v17.7.0, (Sep. 2021), 75 pages.

"3rd Generation Partnership Project; Technical Specification Group Services and System Aspects; Service requirements for the 5G system; Stage 1 (Release 17)", 3GPP TS 22.261 v17.10.0, (Mar. 2022), 83 pages.

CATT [RAN1], "[Draft] LS on UE/TRP TX/RX Timing Errors", 3GPP TSG RAN WG1 Meeting #104bis-e, R1-2104053, (Apr. 12-20, 2021), 2 pages.

Email Discussion Moderator (Intel), "Moderator's summary for discussion [RAN93e-R18Prep-10] Expanded and improved Positioning", 3GPP TSG RAN #93e, RP-211660, (Sep. 13-17, 2021), 67 pages.

Extended European Search Report for European Application No. 22180293.7 dated Dec. 1, 2022, 11 pages.

Peshlov et al., "Optimised Meandered Microstrip Feeds for Planar Antenna Arrays", 2001 31st European Microwave Conference, (Oct. 2001), 4 pages.

\* cited by examiner

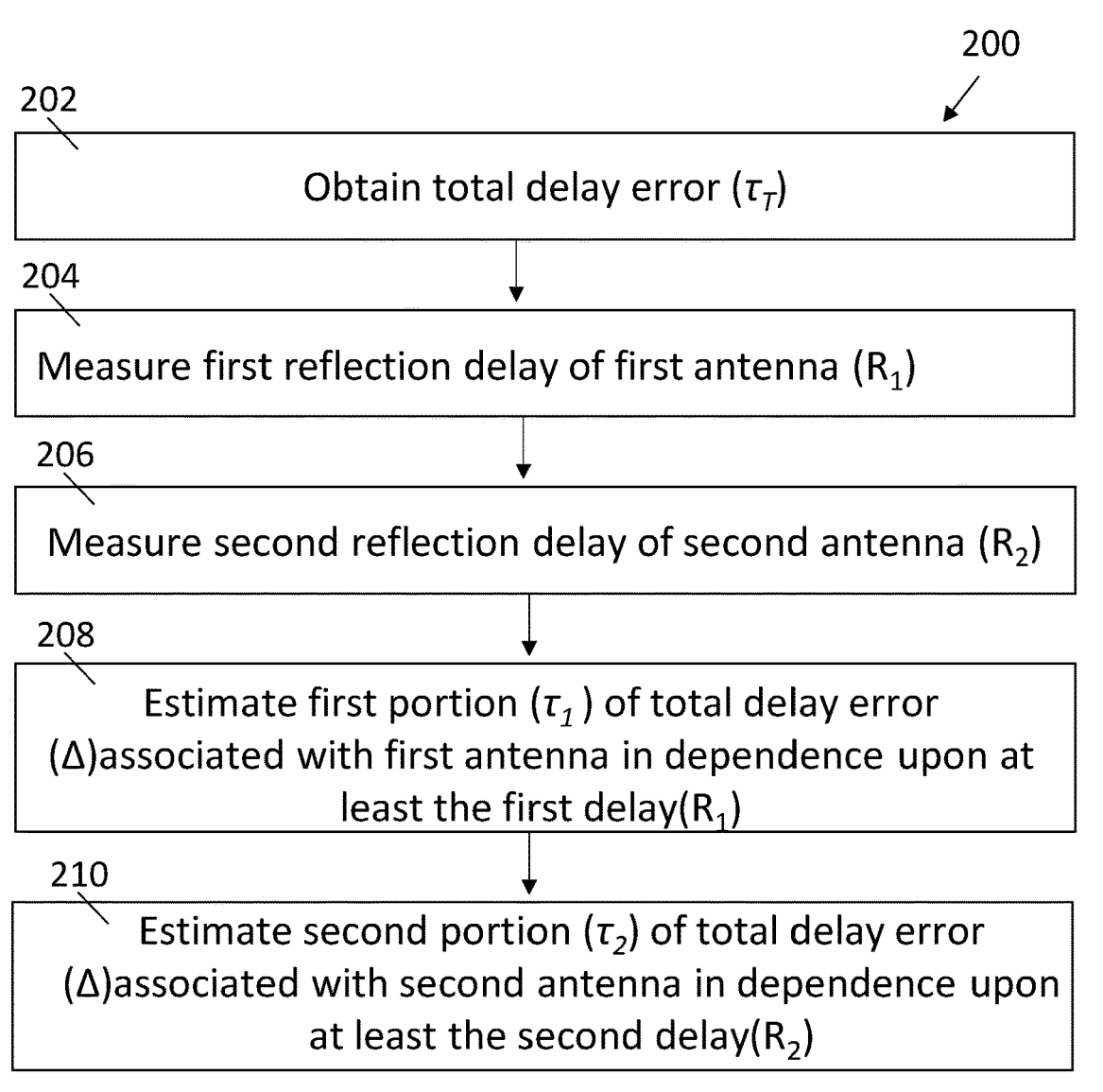

200

202
Obtain total delay error ($\tau_T$)

204
Measure first reflection delay of first antenna ($R_1$)

206
Measure second reflection delay of second antenna ($R_2$)

208
Estimate first portion ($\tau_1$) of total delay error ($\Delta$)associated with first antenna in dependence upon at least the first delay($R_1$)

210
Estimate second portion ($\tau_2$) of total delay error ($\Delta$)associated with second antenna in dependence upon at least the second delay($R_2$)

FIG. 4

Reduce reception timing error t1 -> t1 + $\tau_1$

FIG. 5A

Reduce reception timing error t2 -> t2 − $\tau_2$

FIG. 5B $$\tau_T + T_{ref} = t2-t1$$

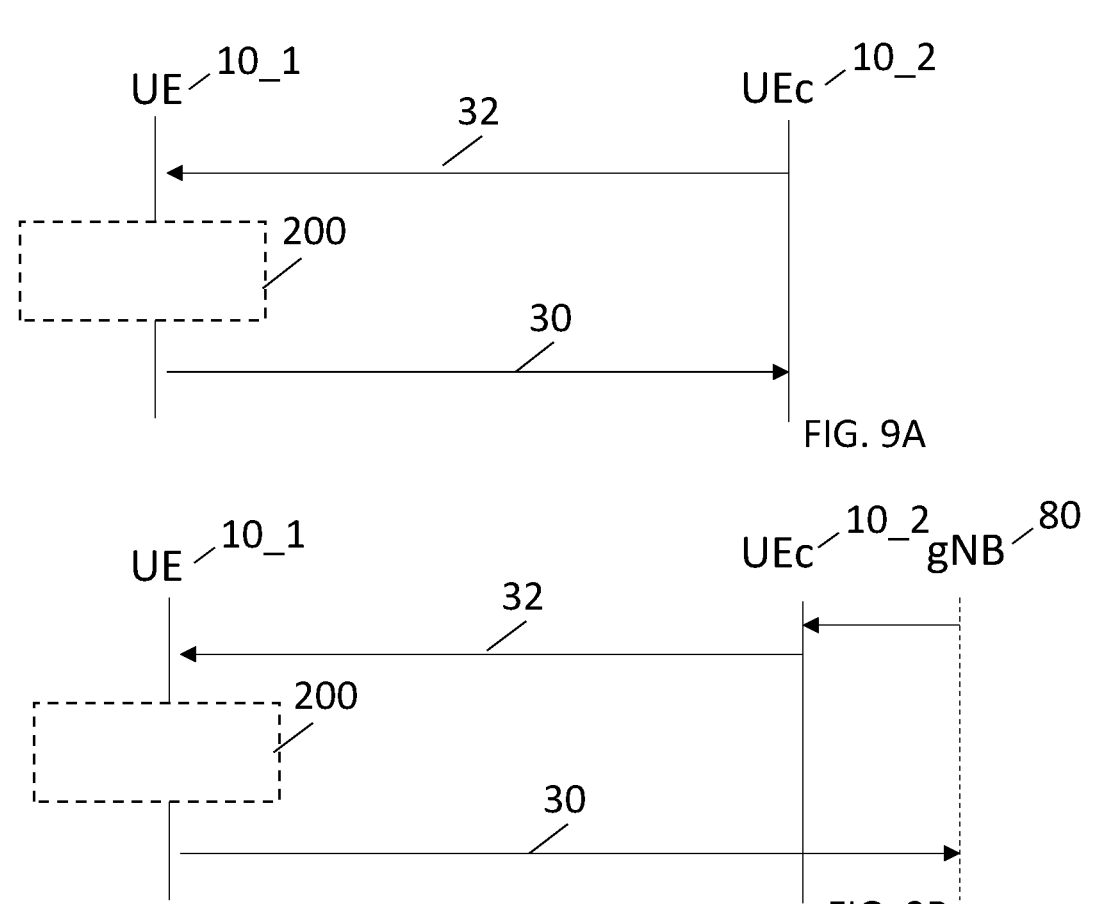
FIG. 9A
FIG. 9B
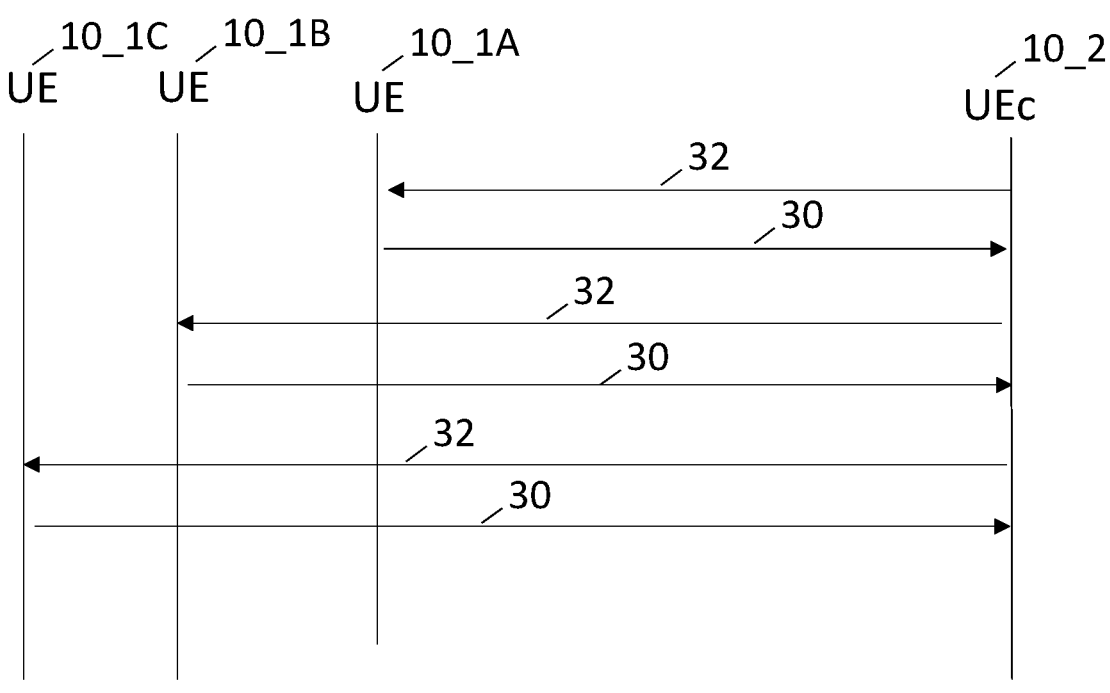
FIG. 10

600
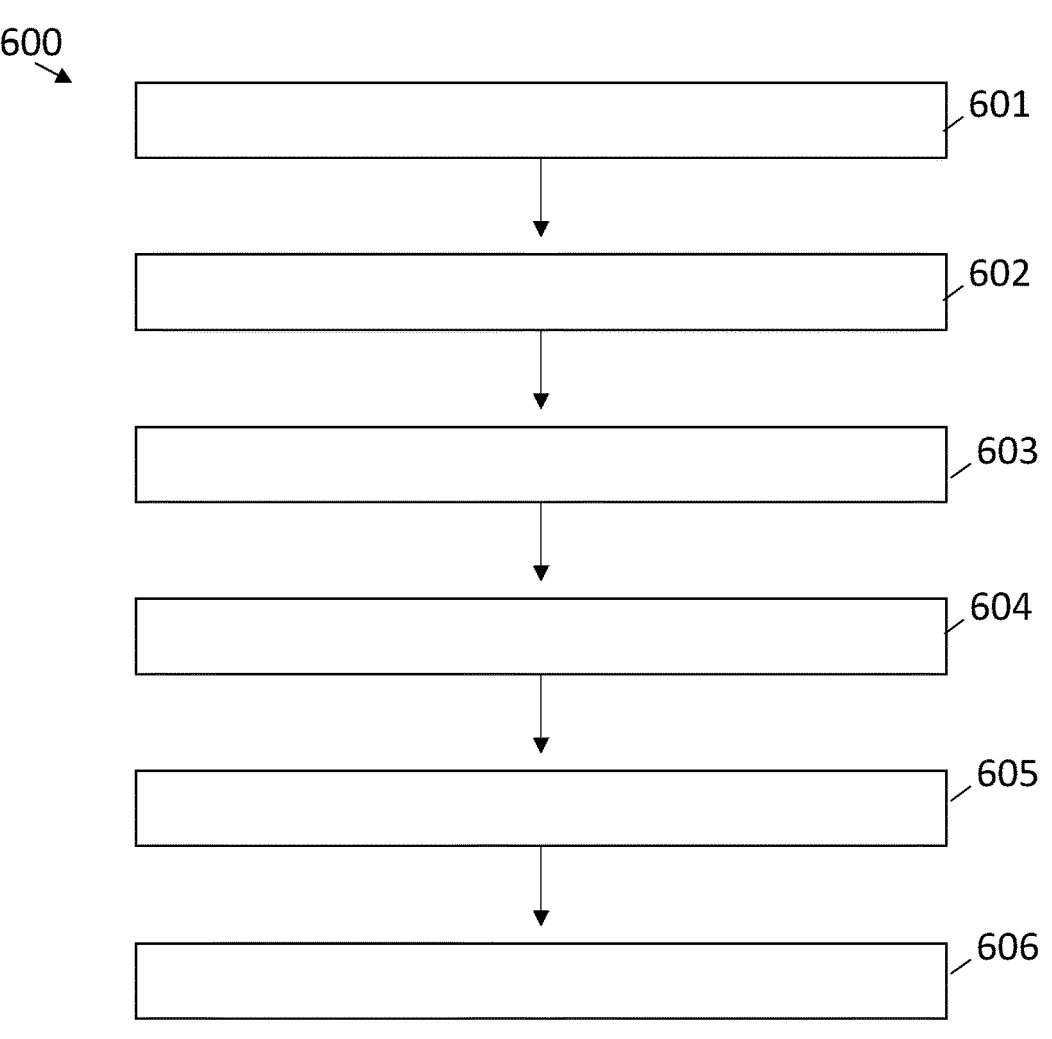
601
602
603
604
605
606
FIG 12
400
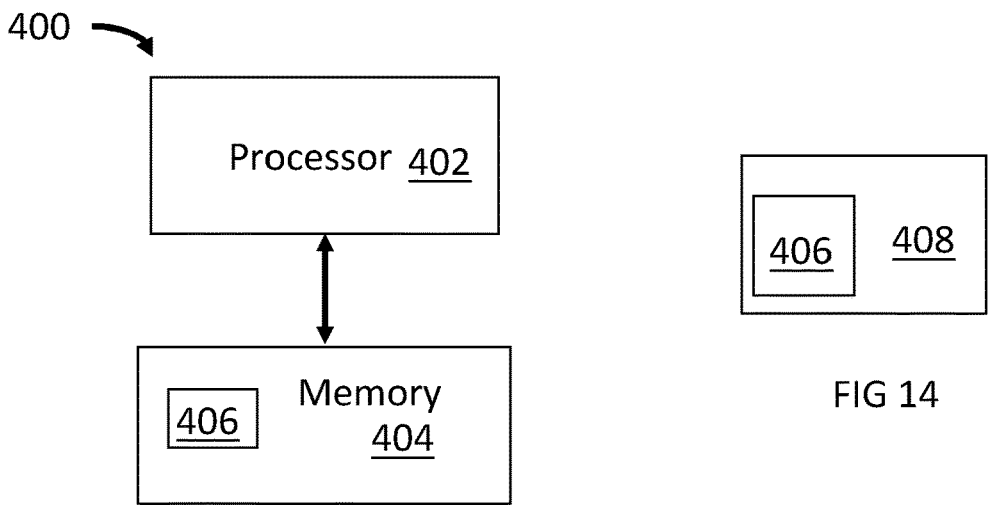
Processor 402
Memory 404
406
406  408
FIG 14
FIG 13

DISTANCE MEASUREMENT

CROSS-REFERENCE TO RELATED APPLICATIONS

This application claims priority to European Patent Application No. 22180293.7, filed Jun. 22, 2022, the entire contents of which are incorporated herein by reference.

TECHNOLOGICAL FIELD

Embodiments of the present disclosure relate to accurate measurement of distance. Some relate to improved positioning accuracy.

BACKGROUND

A positioning service can use the equivalency of a transfer time (travel time) for a radio signal between a transmission point and a reception point to a distance between the transmission point and the travel point because they are related by the speed of light. For example, 1 cm (centimeter) is equivalent to 33 ps (pico seconds) of transfer time.

The distance between a transmission point and a reception point can be converted into an accurate position using various different methods. A distance can for example be combined with a direction of transmission to provide a position. Also, distances (or differences in distances) from multiple transmission points can provide a location of a receiving apparatus via multilateration. Also, distances (or differences in distances) to multiple reception points can provide an orientation of a receiving apparatus via multilateration.

The accurate measurement of transfer time between a transmission point and a reception point is therefore important as an accuracy of 33 ps is equivalent to a distance accuracy of 1 cm.

The time at which a signal is time stamped is different to the time it is transmitted as an electromagnetic wave/received as an electromagnetic wave.

From a signal reception perspective, there will be a reception time delay from the time when the radio signal arrives at the antenna to a 'reception time' of the signal received via the antenna (e.g. the time when the radio signal is time-stamped after digitization). The reception time delay can cause an error. Some options for reducing this error include calibration/compensation of the relative time delay between different radio frequency chains in the same reception point and may also possibly consider the offset of the antenna phase center to the physical antenna center. The error remaining after calibration/compensation (if any) is the reception timing error.

From a signal transmission perspective, there will be a transmission time delay from the 'transmission time' of a signal sent via an antenna (e.g. the time when the radio signal is time-stamped) to when it is transmitted at the antenna. The transmission time delay can cause an error. Some options for reducing this error include calibration/compensation of the relative time delay between time-stamp and antenna feed for different radio frequency chains in the same transmission point and may also possibly consider the offset of the antenna phase center to the physical antenna center. The error remaining after calibration/compensation (if any) is the transmission timing error.

The inventors have realized that further improvements can be made. For example, an additional or alternative reduction to the errors can be made. For example, the reception timing error and/or the reception timing error can be reduced.

The above calibration of the radio frequency chains is performed at the antenna feed point so that the whole radio frequency chain is effectively accounted for in terms of delay (from time-stamp to the antenna feed point). The delay due to the signal propagating, in transmission, from the antenna feed point onwards through the antenna radiator is not accurately known. The delay due to the signal propagating, in reception through the antenna radiator onwards to the antenna feed point is not accurately known.

The invention has application to transfer time measurements, distance measurements based on transfer time measurement, positioning methods (location and/or orientation) that involve transfer time measurements.

One particular application of the invention is in cm accuracy positioning in the third-generation project (3GPP) specifications. In 3GPP, the transfer time can be measured using reference signals. The positioning reference signal (PRS) is used in the downlink and is received by a user equipment. The sounding reference signal (SRS) is used in the uplink and is transmitted by a user equipment.

BRIEF SUMMARY

According to various, but not necessarily all, embodiments there is provided an apparatus comprising:

means for obtaining a total delay error that when added to a reference time equivalent to a reference distance between a first antenna and a second antenna equals a difference between a transmission time of a signal sent via the first antenna and a reception time of the signal received via the second antenna;

means for measuring a frequency-variable first delay associated with reflection of a transmitted signal by a frequency-variable complex impedance of the first antenna;

means for measuring a frequency-variable second delay associated with reflection of a transmitted signal by a frequency-variable complex impedance of the second antenna;

means for estimating a first portion of the total delay error associated with the first antenna in dependence upon at least the first delay; and means for estimating a second portion of the total delay error associated with the second antenna in dependence upon at least the second delay.

In some but not necessarily all examples, the apparatus comprises: means for using the first portion of the total delay error associated with the first antenna to enable a reduction of at least a transmission timing error for transmission via the first antenna.

In some but not necessarily all examples, the apparatus comprises: means for using a second portion of the total delay error associated with the second antenna to enable a reduction of at least a reception timing error for reception via the second antenna.

In some but not necessarily all examples, the apparatus comprises: means for using the first portion of the total delay error associated with the first antenna to enable a reduction of reception timing error for reception via the first antenna and for using a second portion of the total delay error associated with the second antenna to enable a reduction of a transmission timing error for transmission via the second antenna.

In some but not necessarily all examples, the apparatus comprises: the first antenna and the second antenna.

In some but not necessarily all examples, the apparatus comprises:

means for measuring the frequency-variable first delay as a first delay between a time that represents a transmission time of a signal sent via the first antenna and a time that represents a reception time of the signal reflected by the first antenna;

means for measuring the frequency-variable second delay as a second delay between a time that represents a transmission time of a signal sent via the second antenna and a time that represents a reception time of the signal reflected by the second antenna.

In some but not necessarily all examples, the apparatus comprises:

means for estimating the first portion of the total delay error associated with the first antenna comprising applying a first scaling factor to the total delay error, wherein the scaling factor is dependent on the first delay associated with the first antenna and the second delay associated with the second antenna;

estimating the second portion of the total delay error associated with the second antenna comprising applying a second scaling factor to the total delay error, wherein the scaling factor is dependent on the first delay associated with the first antenna and the second delay associated with the second antenna.

In some but not necessarily all examples, the apparatus comprises:

means for estimating the first portion of the total delay error associated with the first antenna by multiplying the first delay by a scaling factor; and means estimating the second portion of the total delay error associated with the second antenna by multiplying the second delay by the scaling factor.

In some but not necessarily all examples, the apparatus comprises: means for estimating the first portion of total delay error associated with the first antenna and the second portion of the total delay error by constraining the sum of first portion of the total delay error associated with the first antenna and the second portion of the total delay error to equal the total delay error.

In some but not necessarily all examples, the apparatus comprises:

estimating the first portion of the total delay error as the total delay error multiplied by the first delay and divided by a sum of the first delay and the second delay;

estimating the second portion of the total delay error as the total delay error multiplied by the second delay and divided by a sum of the first delay and the second delay.

In some but not necessarily all examples, the apparatus comprises:

means for transmitting, to another network entity, the first portion and/or the second portion of the total delay error between the first antenna and second antenna or for transmitting, to another network entity, one or more values determined using the first portion and/or the second portion of the total delay error between the first antenna and second antenna.

In some but not necessarily all examples, the apparatus comprises:

means for measuring, for a set of multiple different pairs of antennas in the apparatus, a total delay error between a first time that represents a transmission time of a signal sent via a first antenna of a pair of antennas and a second time that represents a reception time of the signal at a second antenna of the pair of antennas comprising subtracting, from a time difference between the first time and the second time, a time representing a reference distance between the first antenna and the second antenna of the pair of antennas;

measuring a frequency-variable first delay associated with reflection of a transmitted signal by a frequency-variable complex impedance of the first antenna of the pair of antennas;

measuring a frequency-variable second delay associated with reflection of a transmitted signal by a frequency-variable complex impedance of the second antenna of the pair of antennas;

estimating a first portion of the total delay error associated with the first antenna of the pair of antennas in dependence upon at least the first delay;

estimating a second portion of the total delay error associated with the second antenna of the pair of antennas in dependence upon at least the second delay, wherein the set of multiple different pairs of antennas in the apparatus is a sub-set of all the possible different pairs of antennas in the apparatus, wherein measurements indicate a direct transmission path exists between the pairs of antennas in the set and a direct transmission path does not exist between the pairs of antennas not in the set.

According to various, but not necessarily all, embodiments there is provided a method comprising:

obtaining a total delay error that when added to a reference time equivalent to a reference distance between a first antenna and a second antenna equals a difference between a transmission time of a signal sent via the first antenna and a reception time of the signal received via the second antenna;

measuring a frequency-variable first delay associated with reflection of a transmitted signal by a frequency-variable complex impedance of the first antenna;

measuring a frequency-variable second delay associated with reflection of a transmitted signal by a frequency-variable complex impedance of the second antenna;

estimating a first portion of the total delay error associated with the first antenna in dependence upon at least the first delay;

estimating a second portion of the total delay error associated with the second antenna in dependence upon at least the second delay.

In some but not necessarily all examples, the method comprises:

repeating the method above for different combinations of first and second antennas and/or at different frequencies to obtain a sample comprising multiple estimates of portions of total delay error associated with an antenna and using the sample to estimate the portion of a total delay error expected to be associated with the antenna.

According to various, but not necessarily all, embodiments there is provided a computer program comprising instructions that when run on one or more processors enables:

obtaining a total delay error that when added to a reference time equivalent to a reference distance between a first antenna and a second antenna equals a difference between a transmission time of a signal sent via the first antenna and a reception time of the signal received via the second antenna;

measuring a frequency-variable first delay associated with reflection of a transmitted signal by a frequency-variable complex impedance of the first antenna;

measuring a frequency-variable second delay associated with reflection of a transmitted signal by a frequency-variable complex impedance of the second antenna;

estimating a first portion of the total delay error associated with the first antenna in dependence upon at least the first delay;

estimating a second portion of the total delay error associated with the second antenna in dependence upon at least the second delay.

According to various, but not necessarily all, embodiments there is provided a user equipment (UE) comprising:

means for receiving an antenna resonance induced delay (ARID) of a first antenna of another user equipment (UE);

means for compensating a transfer time or distance between a first antenna in the UE and the first antenna in the other UE using the ARID of the first antenna of the other UE and an ARID of the first antenna of the UE, wherein the transfer time is a difference between a transmission time and a reception time of a signal sent between the first antenna of the UE and the first antenna of the other UE, and wherein ARID of an antenna is a time it takes an applied signal to leave the antenna and depends upon a complex impedance of the antenna.

In some but not necessarily all examples, the user equipment comprises: means for using the compensated transfer time or distance between the first antenna in the UE and the first antenna in the other UE to position the UE relative to the other UE.

In some but not necessarily all examples, the user equipment comprises: means for receiving an ARID of a second antenna of the other UE;

means for compensating a transfer time or distance between the first antenna in the UE and the second antenna in the other UE using the received ARID of the second antenna of the other UE and the ARID of the first antenna of the UE and/or means for compensating a transfer time or distance between a second antenna in the UE and the first antenna in the other UE using the received ARID of the first antenna of the other UE and an ARID of the second antenna of the UE;

and/or means for compensating a transfer time or distance between a second antenna in the UE and the second antenna in the other UE using the received ARID of the second antenna of the other UE and an ARID of the second antenna of the UE.

In some but not necessarily all examples, the user equipment comprises: means for using the compensated transfer time or distance between one or more antennas in the UE and one or more antennas in the other UE to estimate the distance between the respective one or more antennas in the other UE and the respective one or more antennas in the UE to position and/or orient the UE relative to the other UE.

In some but not necessarily all examples, the user equipment is configured to calculate a phase setting at the other UE relative to the UE to enable beam-forming using simultaneously one or more antennas of the UE and one or more antennas of the other UE.

In some but not necessarily all examples, the user equipment is configured to communicate with the other UE to determine the number of antennas at the other UE and configured, for each one of the antennas at the other UE:

to send a positioning signal from a first antenna of the UE to the antenna of the other UE and receive from the other UE an ARID of the antenna of the other UE and a distance-dependent value dependent upon a transfer time of the positioning signal from the first antenna in the UE to the antenna of the other UE.

In some but not necessarily all examples, the user equipment is configured to communicate with the other UE to determine a number of antennas at the other UE and configured, for each different combination of one of the antennas of the UE, referred to as the combination antenna of the UE, and one of the antennas at the other UE, referred to as the combination antenna of the other UE:

send a positioning signal from the combination antenna of the UE to the combination antenna of the other UE and receive from the other UE an ARID of the combination antenna of the other UE and a distance-dependent value dependent upon a transfer time of the positioning signal from the combination antenna of the UE to the combination antenna of the other UE.

In some but not necessarily all examples, the user equipment is configured to communicate with the other UE to determine the number of antennas at the other UE and inform the other UE of the number of antennas at the UE.

According to various, but not necessarily all, embodiments there is provided a computer program comprising instructions that when run on one or more processors of user equipment (UE) enables:

compensating a transfer time or distance between a first antenna in the UE and a first antenna in another UE using a received antenna resonance induced delay (ARID) of the first antenna of the other UE and a calculated ARID of the first antenna of the UE, wherein the transfer time is a difference between a transmission time and a reception time of a signal sent between the first antenna of the UE and the first antenna of the other UE, and wherein ARID of an antenna is a time it takes an applied signal to leave the antenna and depends upon a complex impedance of the antenna.

According to various, but not necessarily all, embodiments there is provided a method at user equipment (UE) comprising:

receiving an antenna resonance induced delay (ARID) of a first antenna of another user equipment (UE);

compensating a transfer time or distance between a first antenna in the UE and the first antenna in the other UE using the received ARID of the first antenna of the other UE and an ARID of the first antenna of the UE, wherein the transfer time is a difference between a transmission time and a reception time of a signal sent between the first antenna of the UE and the first antenna of the other UE, and wherein ARID of an antenna is a time it takes an applied signal to leave the antenna and depends upon a complex impedance of the antenna.

According to various, but not necessarily all, embodiments there is provided a user equipment (UE) comprising:

means for obtaining a distance-dependent value dependent upon a transfer time from a first antenna in another user equipment (UE) to a first antenna in the UE;

means for estimating an ARID of the first antenna of the UE;

means for compensating the distance-dependent value dependent upon a transfer time from the first antenna in the other UE to the first antenna in the UE using the measured ARID of the first antenna of the UE and transmit the compensated distance-dependent value or a parameter indicative of the compensated distance-dependent value from the UE to the other UE.

According to various, but not necessarily all, embodiments there is provided a user equipment (UE), comprising:

means for obtaining a distance-dependent value dependent upon a transfer time from a first antenna in another user equipment (UE) to a first antenna in the UE;

means for estimating an ARID of the first antenna of the UE;

means for sending the determined distance-dependent value from the first antenna in the UE to the other UE and for sending the measured ARID of the first antenna of the UE to enable compensation of the distance-dependent value using the measured ARID of the first antenna of the UE.

According to various, but not necessarily all, embodiments there is provided a user equipment (UE) comprising:

means for receiving a request to provide antenna resonance induced delay (ARID) information for one antenna or for more antennas;

means for providing, in reply to the request, an ARID of at least one antenna of the UE, or information determined from the ARID of at least one antenna of the UE, wherein the ARID of an antenna is a time it takes an applied signal to leave the antenna and depends upon a complex impedance of the antenna.

In some but not necessarily all examples, the user equipment comprises means for calculating an ARID of at least one antenna of the UE In some but not necessarily all examples, providing, in reply to the request, an ARID of at least one antenna of the UE, or information determined from the ARID of at least one antenna of the UE, comprises providing, in reply to the request, for each of multiple antennas of the UE, an ARID of the antenna or information determined from the ARID of the antenna.

In some but not necessarily all examples, the user equipment comprises means for calculating the ARID for each of multiple antennas of the UE.

In some but not necessarily all examples, the user equipment comprises means for providing, in reply to the request, in addition to the ARID for at least one antenna of the UE, a distance-dependent value dependent upon a transfer time between the at least one antenna of the UE and a reference antenna, wherein the reference antenna is optionally an antenna of a source of the request.

In some but not necessarily all examples, the user equipment comprises means for providing, in reply to the request a distance-dependent value dependent upon a transfer time between the at least one antenna of the UE and a reference antenna, that has been compensated using the ARID for at least one antenna of the UE.

In some but not necessarily all examples, the user equipment comprises means for providing, in reply to the request, distance-dependent values dependent upon transfer times between different combinations of antennas of the UE and one or more reference antennas, optionally antennas of a source of the request.

In some but not necessarily all examples, the user equipment comprises:

a first antenna and a second antenna; and means for obtaining a total delay error that when added to a reference time equivalent to a reference distance between the first antenna and the second antenna equals a difference between a transmission time of a signal sent via the first antenna and a reception time of the signal received via the second antenna;

means for measuring a frequency-variable first delay associated with reflection of a transmitted signal by a frequency-variable complex impedance of the first antenna;

means for measuring a frequency-variable second delay associated with reflection of a transmitted signal by a frequency-variable complex impedance of the second antenna;

means for estimating a first portion of the total delay error associated with the first antenna in dependence upon at least the first delay to calculate an ARID for the first antenna or information dependent upon the ARID for the first antenna; and means for estimating a second portion of the total delay error associated with the second antenna in dependence upon at least the second delay to calculate an ARID for the second antenna or information dependent upon the ARID for the second antenna.

In some but not necessarily all examples, the user equipment comprises:

means for receiving an antenna resonance induced delay (ARID) of a first antenna of another user equipment (UE);

means for compensating a transfer time or distance between a first antenna in the UE and the first antenna in the other UE using the ARID of the first antenna of the other UE and an ARID of the first antenna of the UE, wherein the transfer time is a difference between a transmission time and a reception time of a signal sent between the first antenna of the UE and the first antenna of the other UE, and wherein ARID of an antenna is a time it takes an applied signal to leave the antenna and depends upon a complex impedance of the antenna.

According to various, but not necessarily all, embodiments there is provided a computer program comprising instructions that when run on one or more processors enables:

receiving a request to provide antenna resonance induced delay (ARID) information for one or more antennas;

providing, in reply to the request, an ARID of at least one antenna of the UE, or information determined from the ARID of at least one antenna of the UE, wherein the ARID of an antenna is a time it takes an applied signal to leave the antenna and depends upon a complex impedance of the antenna.

According to various, but not necessarily all, embodiments there is provided a method comprising:

receiving a request to provide antenna resonance induced delay (ARID) information for one antenna or for more antennas; and providing, in reply to the request, an ARID of at least one antenna of the UE, or information determined from the ARID of at least one antenna of the UE, wherein the ARID of an antenna is a time it takes an applied signal to leave the antenna and depends upon a complex impedance of the antenna.

According to various, but not necessarily all, embodiments there is provided a radio communication apparatus comprising:

means for requesting, directly or indirectly, a user equipment to provide antenna resonance induced delay (ARID) information for one or more antennas of the UE;

means for receiving in reply:

an ARID of at least one antenna of the UE, or information determined from the ARID of at least one antenna of the UE, wherein the ARID of an antenna is a time it takes an applied signal to leave the antenna and depends upon a complex impedance of the antenna.

In some but not necessarily all examples, the radio communication apparatus is configured as a base station. In some but not necessarily all examples, the radio communication apparatus is configured as user equipment.

In some but not necessarily all examples, the radio communication apparatus comprises: means for requesting a user equipment (UE) to provide antenna resonance induced delay (ARID) information for one or more antennas of the UE comprises means for causing the UE to calculate an ARID of at least one antenna of the UE.

In some but not necessarily all examples, the radio communication apparatus comprises: means for receiving, in reply to the request, for each of multiple antennas of the UE, an ARID of the antenna or information determined from the ARID of the antenna.

In some but not necessarily all examples, the radio communication apparatus comprises: means for receiving, in reply to the request, in addition to the ARID for at least one antenna of the UE, a distance-dependent value dependent upon a transfer time between the at least one antenna of the UE and a reference antenna, optionally an antenna of a source of the request.

In some but not necessarily all examples, the radio communication apparatus comprises: means for receiving, in reply to the request a distance-dependent value dependent upon a transfer time between the at least one antenna of the UE and a reference antenna, optionally an antenna of a source of the request, that has been compensated using the ARID for at least one antenna of the UE.

In some but not necessarily all examples, the radio communication apparatus comprises: a first antenna and a second antenna; and means for obtaining a total delay error that when added to a reference time equivalent to a reference distance between the first antenna and the second antenna equals a difference between a transmission time of a signal sent via the first antenna and a reception time of the signal received via the second antenna;

means for measuring a frequency-variable first delay associated with reflection of a transmitted signal by a frequency-variable complex impedance of the first antenna;

means for measuring a frequency-variable second delay associated with reflection of a transmitted signal by a frequency-variable complex impedance of the second antenna;

means for estimating a first portion of the total delay error associated with the first antenna in dependence upon at least the first delay to calculate an ARID for the first antenna or information dependent upon the ARID for the first antenna; and means for estimating a second portion of the total delay error associated with the second antenna in dependence upon at least the second delay to calculate an ARID for the second antenna or information dependent upon the ARID for the second antenna.

In some but not necessarily all examples, the radio communication apparatus is configured as user equipment (UE), comprising:

means for receiving an antenna resonance induced delay (ARID) of a first antenna of another user equipment (UE);

means for compensating a transfer time or distance between a first antenna in the UE and the first antenna in the other UE using the ARID of the first antenna of the other UE and an ARID of the first antenna of the UE, wherein the transfer time is a difference between a transmission time and a reception time of a signal sent between the first antenna of the UE and the first antenna of the other UE, and wherein ARID of an antenna is a time it takes an applied signal to leave the antenna and depends upon a complex impedance of the antenna.

According to various, but not necessarily all, embodiments there is provided user equipment (UE) comprising:

means for requesting another user equipment to provide antenna resonance induced delay (ARID) information for one or more antennas of the other UE;

means for receiving in reply:

a calculated ARID of at least one antenna of the other UE, or information determined from a calculated ARID of at least one antenna of the other UE.

According to various, but not necessarily all, embodiments there is provided a computer program comprising instructions that when run on one or more processors enables:

requesting, directly or indirectly, a user equipment to provide antenna resonance induced delay (ARID) information for one or more antennas of the UE;

receiving in reply an ARID of at least one antenna of the UE, or information determined from the ARID of at least one antenna of the UE, wherein the ARID of an antenna is a time it takes an applied signal to leave the antenna and depends upon a complex impedance of the antenna.

According to various, but not necessarily all, embodiments there is provided

A method comprising:

requesting, directly or indirectly, a user equipment to provide antenna resonance induced delay (ARID) information for one or more antennas of the UE;

receiving in reply an ARID of at least one antenna of the UE, or information determined from the ARID of at least one antenna of the UE, wherein the ARID of an antenna is a time it takes an applied signal to leave the antenna and depends upon a complex impedance of the antenna.

According to various, but not necessarily all, embodiments there is provided examples as claimed in the appended claims.

BRIEF DESCRIPTION

Some examples will now be described with reference to the accompanying drawings in which:

FIG. 4 shows another example of the subject matter described herein;

FIG. 5A shows another example of the subject matter described herein;

FIG. 5B shows another example of the subject matter described herein;

FIG. 9A shows another example of the subject matter described herein;

FIG. 9B shows another example of the subject matter described herein;

FIG. 10 shows another example of the subject matter described herein;

FIG. 12 shows another example of the subject matter described herein;

FIG. 13 shows another example of the subject matter described herein;

FIG. 14 shows another example of the subject matter described herein.

DETAILED DESCRIPTION

Figure 1:
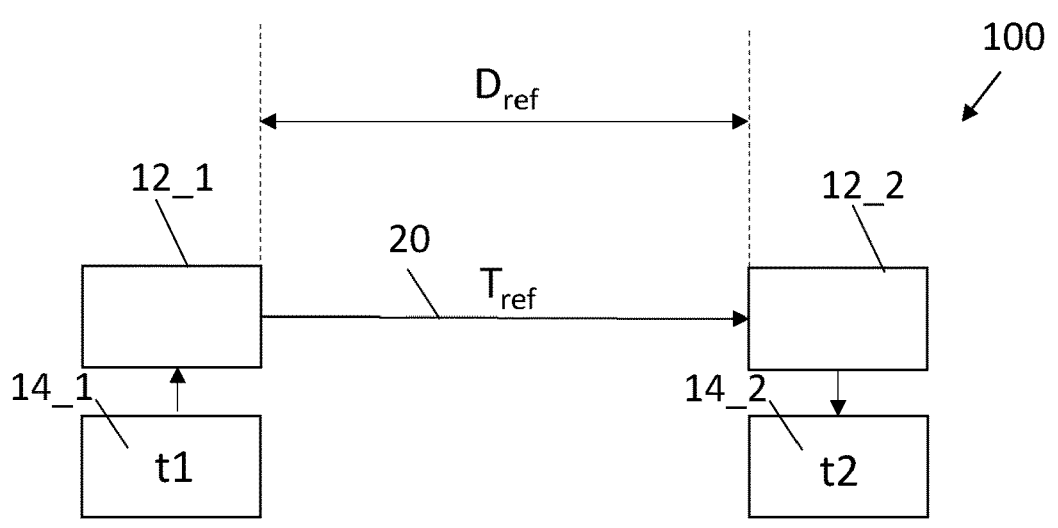
FIG. 1 shows an example of the subject matter described herein.

FIG. 1 illustrates an example of an apparatus 100 comprising: means for obtaining a total delay error $\tau_T$ that when added to a reference time $T_{ref}$ equivalent to a reference distance $D_{ref}$ between a first antenna 12_1 and a second antenna 12_2 equals a difference $\Delta$ between a transmission time (t1) of a signal 20 sent via the first antenna 12_1 and a reception time (t2) of the signal 20 received via the second antenna 12_2.

In at least some examples, the apparatus 100 is configured to determine the total delay error $\tau_T$ between a detected transmission time t1 of the signal 20 sent via the first antenna 12_1 and a detected reception time t2 of the signal 20 received via the second antenna 12_2. The determination comprises subtracting, from a time difference $\Delta$ between the reception time t2 and the transmission time t1, a reference time $T_{ref}$ equivalent to the reference distance $D_{ref}$ between the first antenna 12_1 and the second antenna 12_2.

The time difference $\Delta$ between the reception time t2 and the transmission time t1 is the transfer time or time-of-flight. Thus:

$$\tau_T + T_{ref} = t2 - t1 = \Delta$$

Figure 2:
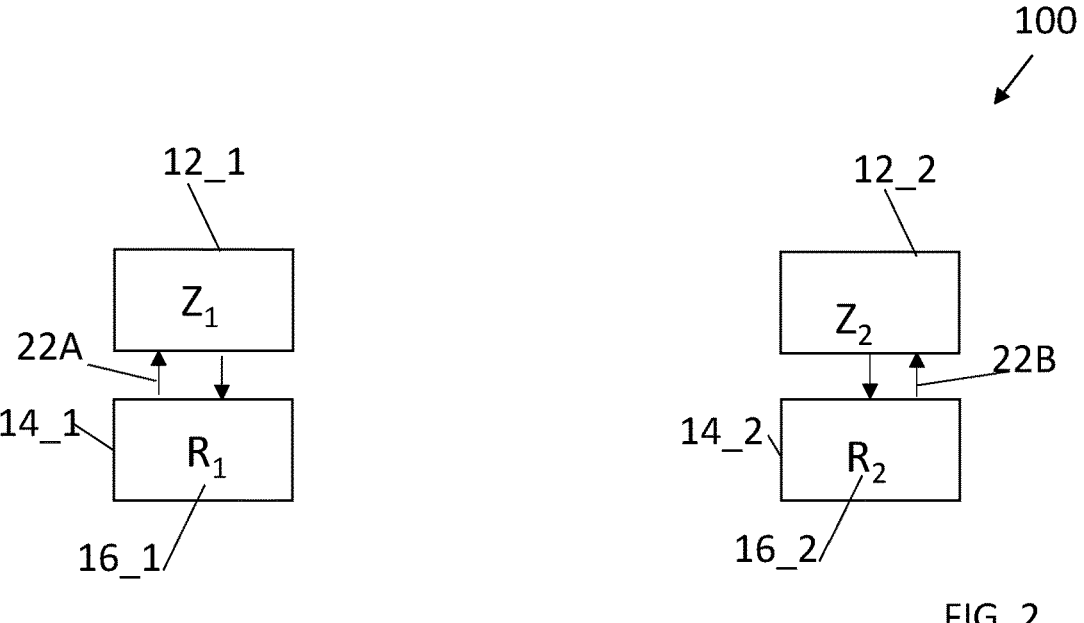
FIG. 2 shows another example of the subject matter described herein.

As illustrated in FIG. 2, the apparatus 100 additionally comprises:

means 14_1 for measuring a frequency-variable first delay ($R_1$) 16_1 associated with reflection of a transmitted signal 22A by a frequency-variable complex impedance $Z_1$ of the first antenna 12_1; and means 14_2 for measuring a frequency-variable second delay ($R_2$) 16_2 associated with reflection of a transmitted signal 22B by a frequency-variable complex impedance $Z_2$ of the second antenna 12_2.

Frequency-variable means that a parameter varies with respect to frequency such that different values of the parameter occur at different frequencies. The impedance of an antenna is frequency-variable by design so that it operates as a frequency selective filter. The impedance is complex and as such the frequency-variable impedance results in a frequency variable delay. The delay varies with respect to frequency such that different values of the delay occur at different frequencies.

Figure 3:
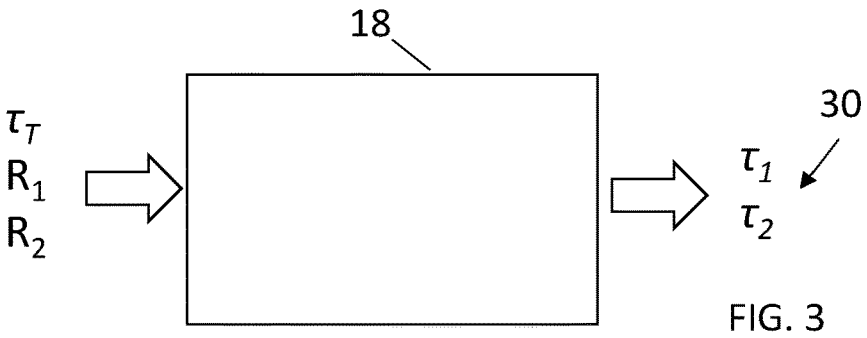
FIG. 3 shows another example of the subject matter described herein.

As illustrated in FIG. 3, the apparatus 100 additionally comprises:

means 18 for estimating a first portion $\tau_1$ of the total delay error $\tau_T$ associated with the first antenna 12_1 in dependence upon at least the first delay $R_1$; and means 18 for estimating a second portion $\tau_2$ of the total delay error $\tau_T$ associated with the second antenna 12_2 in dependence upon at least the second delay $R_2$.

The apparatus 100 can, for example, be a fixed radio communications device or a mobile communications device. The apparatus 100 can for example be a network access node such as a base station e.g., gNB. The apparatus 100 can for example be a network terminal. The apparatus 100 can for example be user equipment.

An antenna 12_1, 12_2 can be anything capable of efficiently transmitting/receiving at an operational frequency and can be, for example, a single antenna element or can be, for example, an array of antenna elements.

The total delay error $\tau_T$ (and any delay or time) can be provided in units of time or distance and can be measured as an absolute or relative value. However, for the purposes of consistency of description it will be referred to as a time and calculations are provided in units of time, however, these have equivalent calculations in space by multiplying by the speed of light.

The first delay $R_1$ comprise a measure of an antenna resonance induced delay (ARID) of the first antenna 12_1. The second delay $R_2$ comprises a measure of an antenna resonance induced delay (ARID) of the second antenna 12_2. The ARID of an antenna is a time it takes an applied signal to leave the respective antenna and depends upon a complex impedance of that antenna. In the transmit direction, the signal is applied via the antenna feed point and leaves via the air interface. In the receive direction, the signal is applied via the air interface and leaves via the antenna feed.

The first portion $\tau_1$ of the total delay error associated with the first antenna 12_1 is an estimate of an ARID 30 of the first antenna 12_1. The second portion $\tau_2$ of the total delay error associated with the second antenna 12_2 is an estimate of an ARID 30 of the second antenna 12_2.

FIG. 4 illustrates an example of a method 200 that can be performed by the apparatus 100.

At block 202, the method 200 comprises: obtaining a total delay error $\tau_T$ that when added to a reference time $T_{ref}$ equivalent to a reference distance between a first antenna 12_1 and a second antenna 12_2 equals a difference $\Delta$ between a transmission time (t1) of a signal 20 sent via the first antenna 12_1 and a reception time (t2) of the signal 20 received via the second antenna 12_2.

At block 204, the method 200 comprises: measuring a frequency-variable first delay $R_1$ associated with reflection of a transmitted signal 22A by a frequency-variable complex impedance $Z_1$ of the first antenna 12_1.

At block 206, the method 200 comprises: measuring a frequency-variable second delay $R_2$ associated with reflection of a transmitted signal 22B by a frequency-variable complex impedance $Z_2$ of the second antenna 12_2.

At block 208, the method 200 comprises: estimating a first portion $\tau_1$ of the total delay error $\tau_T$ associated with the first antenna 12_1 in dependence upon at least the first delay.

At block 210, the method 200 comprises estimating a second portion $\tau_2$ of the total delay error $\tau_T$ associated with the second antenna 12_2 in dependence upon at least the second delay.

In some examples, the method 200 can be repeated for different combinations of first and second antennas and/or at different frequencies to obtain a sample comprising multiple estimates of portions $\tau_n$ of total delay error $\tau_T$ associated with an antenna 12_n and using the sample to estimate the portion $\tau_n$ of a total delay error $\tau_T$ expected (on average) to be associated with the antenna 12_n.

In some examples, the portion r of a total delay error $\tau_T$ is used to achieve more accurate positioning of the apparatus 100 and/or of antennas 12 of the apparatus 100. The method 200 can, in some examples, be used where centimeter (cm) accuracy is required in positioning. The method 200 is not limited to cm accuracy positioning and could be used to satisfy greater or lesser accuracy requirements.

In some examples, the total delay error $\tau_T$, frequency-variable first delay $R_1$ and the frequency-variable second delay $R_2$ are measured using signals 20, 22A, 22B having the same or similar frequency. For example, the total delay error $\tau_T$, frequency-variable first delay $R_1$ and the frequency-variable second delay $R_2$ can be measured using signals 20, 22A, 22B in the same frequency band. In other examples, different frequencies and/or frequency bands can be used.

In at least some examples, the method 200 is performed dynamically, for example, when a recalibration event occurs or is detected. A recalibration event can for example be:

movement of an apparatus 100 comprising the first antenna 12_1 and the second antenna 12_2 (e.g. a change in position, a change in orientation and/or location); and/or proximity detection which could affect a complex impedance of an antenna and/or a change in the frequency of signals used for positioning and/or a change in a measurement of an impedance related value of the antennas.

In at least some examples, for example as illustrated in FIG. 5A, the apparatus 100 is configured to use the first portion $\tau_1$ of the total delay error $\tau_T$ associated with the first antenna 12_1 to enable a reduction of at least a transmission timing error for transmission via the first antenna 12_1 e.g., t1→t1+$\tau_1$. The transmission time is moved forwards (advanced) by the portion $\tau_i$ of the total delay error $\tau_T$ associated with the transmitting antenna 12_i.

In at least some examples, for example as illustrated in FIG. 5B, the apparatus 100 is configured to use the second portion $\tau_2$ of the total delay error $\tau_T$ associated with the second antenna 12_2 to enable a reduction of at least a reception timing error for reception via the second antenna 12_2 e.g., t2→t2−$\tau_2$. The reception time is moved backwards by the portion $\tau_j$ of the total delay error $\tau_T$ associated with the receiving antenna 12_j.

In at least some examples, for example as illustrated in FIGS. 5A & 5B, the apparatus 100 is configured to use the first portion $\tau_1$ of the total delay error $\tau_T$ associated with the first antenna 12_1 to enable a reduction of reception timing error for reception via the first antenna 12_1 and use the second portion $\tau_2$ of the total delay error $\tau_T$ associated with the second antenna 12_2 to enable a reduction of a transmission timing error for transmission via the second antenna 12_2.

Figure 6A:
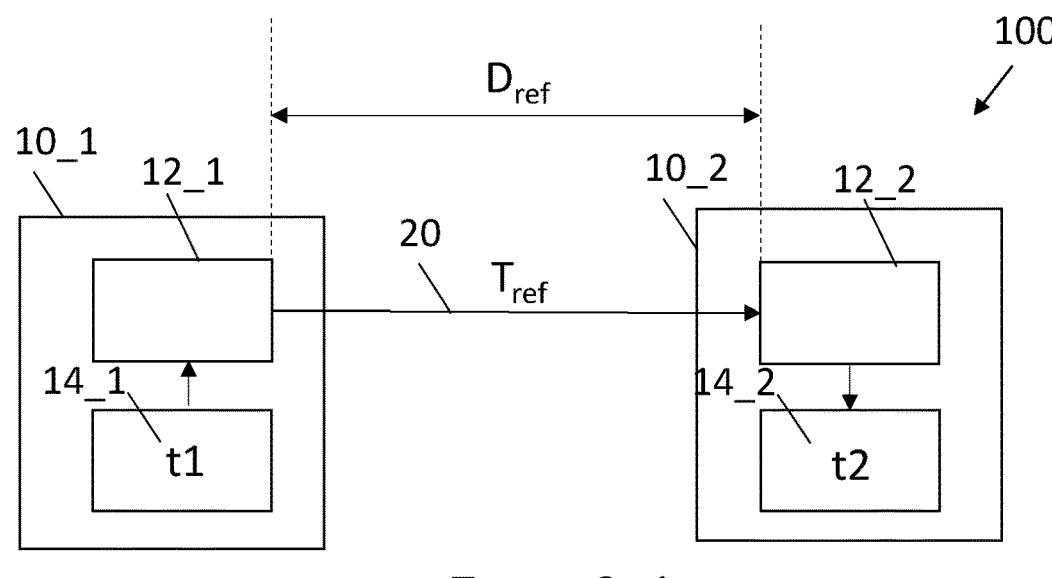
FIG. 6A shows another example of the subject matter described herein.

FIG. 6A illustrates an example in which the first antenna 12_1 and the second antenna 12_2 is in distinct, separate apparatus for example user equipment 10_1, 10_2. In this far-field example, the reference time $\tau_{ref}$ equivalent to a reference distance between a first antenna 12_1 and a second antenna 12_2 can be compensated for phase center offset (PCO) of the antennas 12_1, 12_2 in the far field.

Figure 6B:
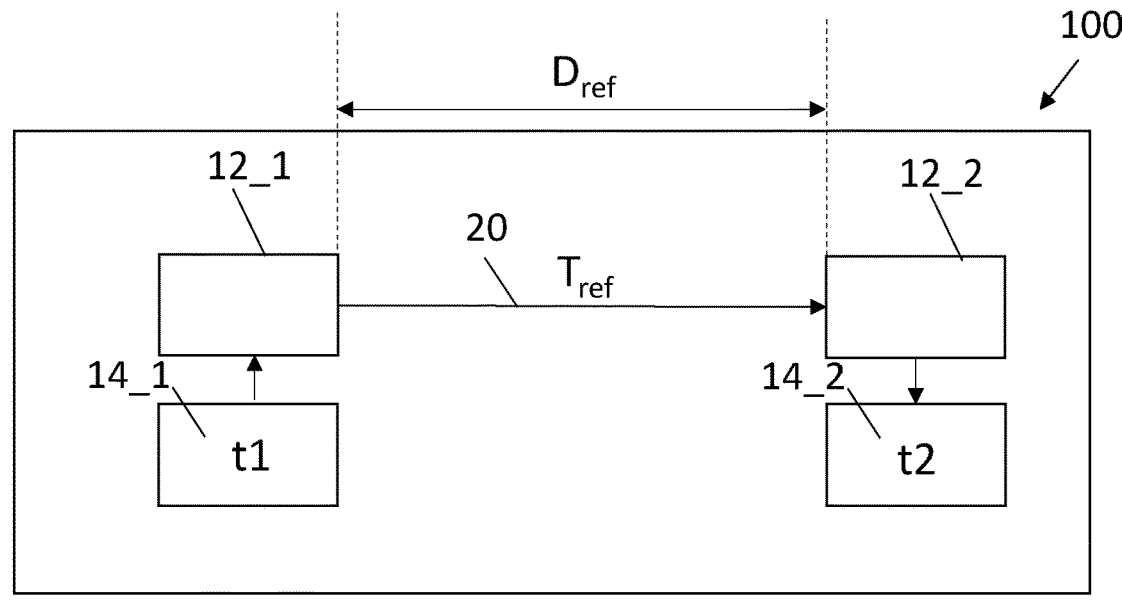
FIG. 6B shows another example of the subject matter described herein.

FIG. 6B illustrates an example in which the first antenna 12_1 and the second antenna 12_2 is in the same apparatus 100. In this example, the physical distance between the first antenna 12_1 and the second antenna 12_2 is such that the reference time $T_{ref}$ equivalent to a reference distance between a first antenna 12_1 and a second antenna 12_2 is not compensated for phase center offset (PCO), however, this could occur for greater separation distances.

The apparatus 100 can, for example, be a fixed radio communications device or a mobile communications device. The apparatus 100 can for example be a network access node such as is a base station e.g., gNB. The apparatus 100 can for example be a network terminal. The apparatus 100 can for example be user equipment 10.

The apparatus 100 comprises the first antenna 12_1 and the second antenna 12_2.

In at least some but not necessarily all examples, the first antenna 12_1 and second antenna 12_2 are located at a fixed separation distance. In other examples, a user equipment 10 is flexible and the first antenna 12_1 and second antenna 12_2 are located at a variable separation distance. In this example, the calibration can occur when the user equipment 10 is in a known configuration with a known physical separation distance between the first antenna 12_1 and second antenna 12_2.

Referring back to FIG. 2, the apparatus 100 comprises:

means 14_1 for measuring the frequency-variable first delay $R_1$ as a first antenna delay between a time that represents a transmission time of a signal 22A sent via the first antenna 12_1 of the apparatus and a time that represents a reception time of the signal 22A reflected by the first antenna 12_1 of the apparatus; and means 14_2 for measuring the frequency-variable second delay $R_2$ as a second antenna delay between a time that represents a transmission time of a signal 22B sent via the second antenna 12_2 of the apparatus and a time that represents a reception time of the signal 22B reflected by the second antenna 12_2 of the apparatus.

The first antenna delay represents the time between transmission and reception of an internally reflected signal by the first antenna 12_1. The second antenna delay represents the time between transmission and reception of an internally reflected signal by the second antenna 12_2.

In the following workings, the time difference Δ is the time between the reception time t2 and the transmission time t1. It is the transfer time or time-of-flight. $\tau_T$ is the total delay error associated with the first antenna 12_1 and the second antenna 12_2. $\tau_1$ is the first portion of the total delay error $\tau_T$ which is that portion of the total delay error associated with first antenna 12_1. $\tau_2$ is the second portion of the total delay error $\tau_T$ which is that portion of the total delay error associated with second antenna 12_2. $R_1$ is the first delay associated with first antenna 12_1. The first delay $R_1$ is associated with reflection of a transmitted signal 22A by a frequency-variable complex impedance $Z_1$ of the first antenna 12_1. $R_2$ is the second delay associated with second antenna 12_2. The second delay $R_2$ is associated with reflection of a transmitted signal 22B by a frequency-variable complex impedance $Z_2$ of the second antenna 12_2.

As previously described, the apparatus 100 comprises:

means for obtaining a total delay error $\tau_T$ that when added to a reference time $T_{ref}$ equivalent to a reference distance $D_{ref}$ between a first antenna 12_1 and a second antenna 12_2 equals a difference $\Delta$ between a transmission time t1 of a signal 20 sent via the first antenna 12_1 and a reception time t2 of the signal 20 received via the second antenna 12_2;

means for measuring a frequency-variable first delay $R_1$ associated with reflection of a transmitted signal 22A by a frequency-variable complex impedance $Z_1$ of the first antenna 12_1;

means for measuring a frequency-variable second delay $R_2$ associated with reflection of a transmitted signal 22B by a frequency-variable complex impedance $Z_2$ of the second antenna 12_2;

means for estimating a first portion $\tau_1$ of the total delay error $\tau_T$ associated with the first antenna 12_1 in dependence upon at least the first delay $R_1$; and means for estimating a second portion $\tau_2$ of the total delay error $\tau_T$ associated with the second antenna 12_2 in dependence upon at least the second delay $R_2$.

The first portion $\tau_1$ of the total delay error $\tau_T$ associated with the first antenna 12_1 is estimated in dependence upon at least the first delay $R_1$ associated with first antenna 12_1. For example, the first portion $\tau_1$ can be determined from a first function (f1) that takes one or more arguments including the first delay $R_1$ e.g., $\tau_1 = f1(R_1, \dots)$. The second portion $\tau_2$ of the total delay error $\tau_T$ associated with the second antenna 12_2 is estimated in dependence upon at least the second delay $R_2$ associated with second antenna 12_2. For example, the second portion $\tau_2$ can be determined from a second function (f2) that takes one or more arguments including the second delay $R_2$ e.g., $\tau_2 = f2(R_2, \dots)$ In some examples, the first portion $\tau_1$ is determined from a first function (f1) that takes one or more arguments including the first delay $R_1$ and the second delay $R_2$ e.g., $\tau_1 = f1(R_1, R_2 \dots)$ and the second portion $\tau_2$ is determined from a second function (f2) that takes one or more arguments including the first delay $R_1$ and the second delay $R_2$ e.g., $\tau_2 = f2(R_1, R_2 \dots)$.

In some examples, the first portion $\tau_1$ of the total delay error $\tau_T$ associated with the first antenna 12_1 is estimated by applying a first scaling factor to the total delay error $\tau_T$. In some examples, the scaling factor is dependent on the first delay $R_1$ associated with the first antenna 12_1 and the second delay $R_2$ associated with the second antenna 12_2 and the second portion $\tau_2$ of the total delay error $\tau_T$ associated with the second antenna 12_2 is estimated by applying a second scaling factor to the total delay error $\tau_T$. In some examples, the scaling factor is dependent on the first delay $R_1$ associated with the first antenna 12_1 and the second delay $R_2$ associated with the second antenna 12_2.

In some examples, the first portion $\tau_1$ of the total delay error $\tau_T$ associated with the first antenna 12_1 is estimated by multiplying the first delay $R_1$ by a scaling factor and the second portion $\tau_2$ of the total delay error $\tau_T$ associated with the second antenna 12_2 is estimated by multiplying the second delay $R_2$ by a scaling factor e.g.

$$\tau_1 = aR_1 \text{ or } aR_1 + c, \text{ where } c \text{ is an arbitrary constant.}$$

$$\tau_2 = bR_2$$

In at least some examples, the scaling factor is the same:

$$\tau_1 = aR_1 \tau_2 = aR_2 \qquad [1]$$

In some examples, the first portion $\tau_1$ of the total delay error $\tau_T$ associated with the first antenna 12_1 and the second portion $\tau_2$ of the total delay error $\tau_T$ associated with the second antenna 12_2 are estimated by constraining the sum of first portion $\tau_1$ of the total delay error $\tau_T$ associated with the first antenna 12_1 and the second portion $\tau_2$ of the total delay error $\tau_T$ to equal the total delay error $\tau_T$.

$$\tau_1 + \tau_2 = \tau T \qquad [2]$$

It follows from [1] and [2] that: $\tau_1 + \tau_2 = \tau_T$, $\tau_1 = a R_1$, $\tau_2 = a R_2$ $$\Rightarrow aR_1 + aR_2 = \tau_T$$

$$\Rightarrow a = \tau_T / (R_1 + R_2)$$

$$\Rightarrow \tau_1 = aR_1 = \tau_T[R_1 / (R_1 + R_2)] \& \tau_2 = aR_2 = \tau_T[R_2 / (R_1 + R_2)]$$

Thus, in some examples, the first portion $\tau_1$ of the total delay error $\tau_T$ associated with the first antenna 12_1 is estimated by multiplying the total delay error $\tau_T$ by a first scaling factor consisting of the first delay $R_1$ divided by a sum of the first delay $R_1$ and the second delay $R_2$ and the second portion $T_2$ of the total delay error $\tau_T$ associated with the second antenna 12_2 is estimated by multiplying the total delay error $\tau_T$ by a second scaling factor consisting of the second delay $R_2$ divided by a sum of the first delay $R_1$ and the second delay $R_2$.

The total delay error $\tau_T$ is obtained by subtracting the reference time $T_{ref}$ from the transfer time.

$$\tau_T + T_{ref} = t2 - t1 = \Delta$$

$$\Rightarrow \tau_T = \Delta - T_{ref}$$

The reference time $T_{ref}$ can be determined from the reference distance $R_{ref}$. In some examples, it represents the physical distance between the first antenna 12_1 and the second antenna 12_2. In some examples, it represents a compensated physical distance between the first antenna 12_1 and the second antenna 12_2.

Figure 7:
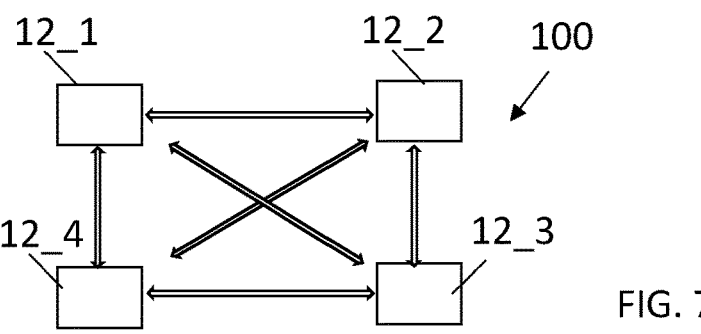
FIG. 7 shows another example of the subject matter described herein.

FIG. 7 illustrates an example of an apparatus 100, for example user equipment 10, comprising an arrangement of multiple antennas 12. In this example, the antennas 12_1, 12_2, 12_3, 12_4 are separated.

Each pair of antennas 12_i, 12_j, the combination (i, j), has an inter-antenna reference time $T_{ref}$ and an inter-antenna transfer time $\Delta$. Consequently, each combination (i, j) has a total delay error $\tau_T$, where $\tau_T = \Delta - T_{ref}$ Each antenna 12 has an associated delay. Thus, the combination (i, j) of antennas has a first delay $R_i$ and a second delay $R_j$.

For each combination (i, j) of antennas 12_i, 12_j, the portion $\tau_i$ of the total delay error $\tau_T$ associated with the antenna 12_i is estimated and the portion $\tau_j$ of the total delay error $\tau_T$ associated with the antenna 12_j is estimated. In one example, the portion $\tau_i$ of the total delay error $\tau_T$ associated with the antenna 12_i is estimated by multiplying the total delay error $\tau_T$ by a first scaling factor consisting of the delay $R_i$ divided by a sum of the delay $R_i$ and the delay $R_j$ and the portion $\tau_j$ of the total delay error $\tau_T$ associated with the antenna 12_j is estimated by multiplying the total delay error $\tau_T$ by a first scaling factor consisting of the delay $R_j$ divided by a sum of the delay $R_i$ and the delay $R_j$.

As previously described, in some examples, the method 200 is performed for a different combination (i, j) of antennas 12_i, 12_j of the apparatus 100 (at the same or different frequencies).

In some examples, the method 200 is performed for all different combination (i, j) of antennas 12_i, 12_j of the apparatus 100.

In some examples, the method 200 is performed for a sub-set of all the different combination (i, j) of antennas 12_i, 12_j of the apparatus 100.

For example, in at least some examples, the apparatus 100 comprises:

a) means for measuring, for a set of multiple different pairs of antennas in the apparatus, a total delay error $\tau_T$ between a first time that represents a transmission time (t1) of a signal 20 sent via a first antenna 12_1 of a pair of antennas and a second time that represents a reception time (t2) of the signal 20 at a second antenna 12_2 of the pair of antennas comprising subtracting, from a time difference $\Delta$ between the first time and the second time, a time $T_{ref}$ representing a reference distance between the first antenna 12_1 and the second antenna 12_2 of the pair of antennas;

b) means for measuring a frequency-variable first delay $R_1$ associated with reflection of a transmitted signal 22A by a frequency-variable complex impedance $Z_1$ of the first antenna 12_1 of the pair of antennas;

c) means for measuring a frequency-variable second delay $R_2$ associated with reflection of a transmitted signal 22B by a frequency-variable complex impedance $Z_2$ of the second antenna 12_2 of the pair of antennas;

d) means for estimating a first portion $\tau_1$ of the total delay error $\tau_T$ associated with the first antenna 12_1 of the pair of antennas in dependence upon at least the first delay;

estimating a second portion $\tau_2$ of the total delay error $\tau_T$ associated with the second antenna 12_2 of the pair of antennas in dependence upon at least the second delay, wherein the set of multiple different pairs of antennas in the apparatus is a sub-set of all the possible different pairs of antennas in the apparatus, wherein measurements indicate a direct transmission path exists between the pairs of antennas in the set and a direct transmission path does not exist between the pairs of antennas not in the set.

In some examples, measurements indicate a direct transmission path exists between the pair of antennas in the set when the time difference $\Delta$ between the first time and the second time for transmission between the pair is within a threshold margin of the time $T_{ref}$ representing a reference distance between the pair.

In some examples, measurements indicate a direct transmission path does not exist between the pair of antennas in the set when the time difference $\Delta$ between the first time and the second time for transmission between the pair is outside a threshold margin of the time $T_{ref}$ representing a reference distance between the pair.

In some examples, measurements indicate a direct transmission path exists between the pair of antennas in the set when the coupled power between the pair is above a first threshold. In some examples, measurements indicate a direct transmission path does not exist between the pair of antennas in the set when the coupled power between the pair is below a second threshold which can, in some examples, be the first threshold.

In other examples, the pairs with direct transmission paths are selected based on coupling strength and/or power delay profiles of coupled signals.

The portion $\tau_i$ of the total delay error associated with the antenna 12_i can be estimated for each pairing of that antenna 12_i and the other antennas (where there is a direct transmission path). The multiple portion $\tau_i$ of the total delay error associated with the antenna 12_i can then be averaged In some examples, the apparatus 100 is configured to not only determine the first portion $\tau_1$ and/or the second portion $\tau_2$ of the total delay error $\tau_T$ between the first antenna 12_1 and second antenna 12_2 but is also configured to communicate the first portion $\tau_1$ and/or the second portion $\tau_2$ to another entity in the network. This network entity could be a user equipment 10, a base station, or a logical entity within the network such as a location management function or positioning function.

The communication, in some examples, is user equipment (UE) to UE or UE to base station or transmission reception point (TRP).

The first portion $\tau_1$ and/or the second portion $\tau_2$ of the total delay error $\tau_T$ between the first antenna 12_1 and second antenna 12_2 can be transmitted as is or in some dependent form. For example, in quantized or parametric form or as an adaptation to another parameter such as the transfer time $\Delta$ e.g. send the compensated transfer time $\Delta - \tau_1$ instead of $\tau_1$.

The first portion $\tau_1$ of the total delay error associated with the first antenna 12_1 is an estimate of an ARID 30 of the first antenna 12_1. The second portion $\tau_2$ of the total delay error associated with the second antenna 12_2 is an estimate of an ARID 30 of the second antenna 12_2.

In the following, the transfer of ARID information 30 therefore refers to the transfer of the first portion $\tau_1$ and/or the second portion $\tau_2$ or of information determined (directly or indirectly) from the first portion $\tau_1$ and/or the second portion $\tau_2$ of the total delay error $\tau_T$ between the first antenna 12_1 and second antenna 12_2.

The ARID Information 30 is Information that Enables Compensation for the ARID.

Thus, the apparatus 100, in some examples, comprises means for transmitting, to another network entity, the first portion $\tau_1$ and/or the second portion $\tau_2$ of the total delay error $\tau_T$ between the first antenna 12_1 and second antenna 12_2 or for transmitting, to another network entity, one or more values determined from or dependent upon the first portion $\tau_1$ and/or the second portion $\tau_2$ of the total delay error $\tau_T$ between the first antenna 12_1 and second antenna 12_2.

In some examples, a position estimate computation is made at a UE, a base station or at a network function such as a location management function. Existing messages can be re-designed to include the ARID information 30 such as messages used to transfer information from the UE to LMF and/or messages used to transfer information from the gNB to LMF. For example, the UE Positioning Assistance Information reported by a UE can be augmented to include additional ARID information.

FIGS. 8A to 8D illustrates various examples. In these examples a user equipment 10_1 performs the method 200 to produce ARID information 30.

Figure 8A:
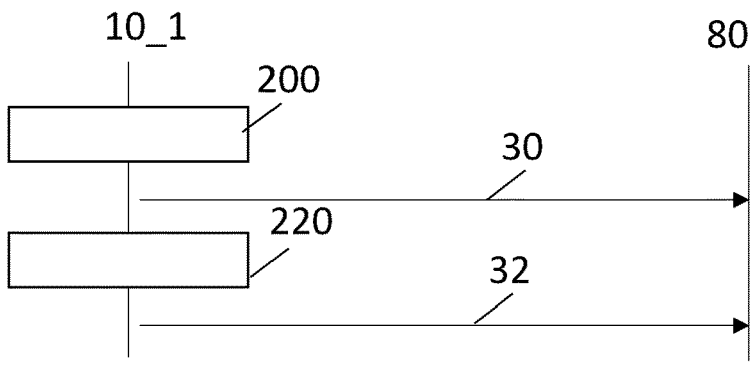
FIG. 8A shows another example of the subject matter described herein.
Figure 8B:
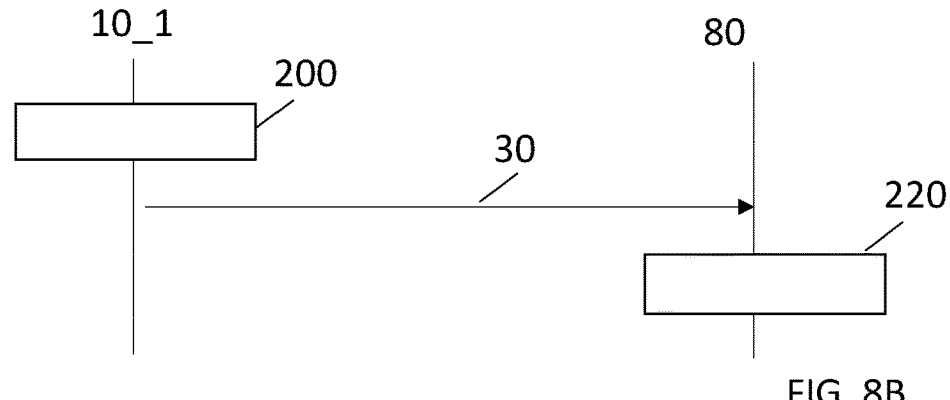
FIG. 8B shows another example of the subject matter described herein.
Figure 8C:
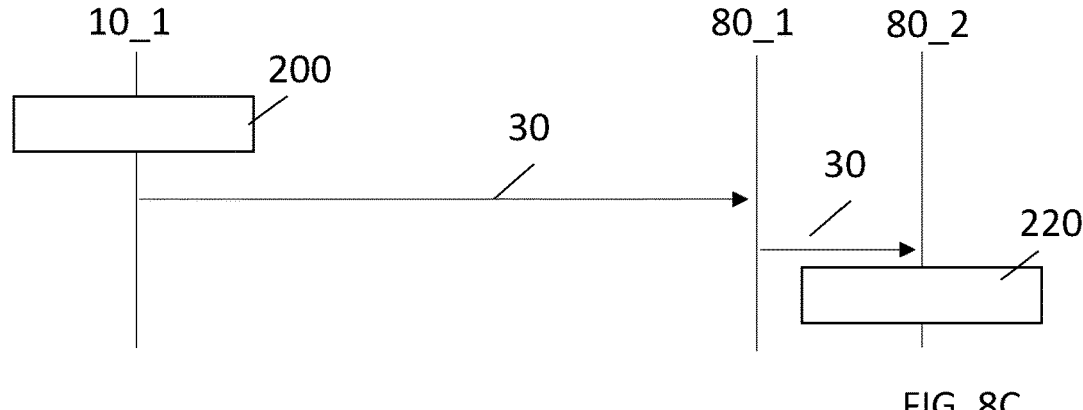
FIG. 8C shows another example of the subject matter described herein.

In FIGS. 8A, 8B, 8C the ARID information 30 is transmitted to another network entity 80. The other network entity 80 can for example be another UE or a base station.

In FIG. 8C the ARID information is transmitted to one network entity 80_1 before being transferred to another network entity 80_2.

The ARID information 30 can in some examples be used for improving the accuracy when positioning the UE 10_1.

The positioning 220 can be performed at the UE 10_1 (FIG. 8A, 8D) or at a network entity 80, 80_2 (FIG. 8B, 8C).

When positioning 220 is performed at the UE 10_1 (FIG. 8A, 8D) then the network transfer time T or compensated network transfer time $T-\tau_i$ can be sent 32 to the other network entity 80. If the UE 10_1 sends the network transfer time T for antenna pair (i, k) and ARID information $\tau_i$ then the network entity can compensate the network transfer time T using ARID information $\tau_k$ e.g. $T-\tau_i-\tau_k$.

The other network entity 80, 80_1 can for example be another UE or a base station.

It should be noted that the network transfer time T is the transfer time between different network entities e.g. UE 10_1 and a reference network entity 80, 80_1. It is an inter-apparatus transfer time. This is in contradistinction to the intra apparatus transfer time Δ. In the following, the combination (i, j) therefore represents antennas in different network entities. In the following, index i will represent the UE 10_1 and index j will represent the network entity 80, 80_1.

In one example (FIG. 8A), the network entity 80 is a UE. The UE 10_1 comprises means for sending a determined distance-dependent value 32 (e.g. a network transfer time T between the first antenna 12_1 in the first UE 10_1 and a reference antenna which in this example is the second antenna 12_2 in the second UE 80) to the second UE 80 and means for sending the measured ARID information 30 of the first antenna 12_1 of UE 10_1 to enable compensation of the distance-dependent value (transfer time) using the measured ARID of the first antenna 12_1 of the UE 10_1.

The second UE 80 determines ARID information of the second antenna 12 of the second UE 80 and compensates the distance-dependent value (network transfer time) using the received ARID 30 of the first antenna 12_1 of the UE 10_1 and the determined ARID of the second antenna 12 of the second UE 80.

In other examples (FIG. 8B, 8C), the UE 10_1 comprises means for sending the measured ARID information 30 of the first antenna 12_1 of UE 10_1 to enable compensation of a distance-dependent value (e.g. a transfer time between the first antenna 12_1 in the first UE 10_1 and a reference antenna which in this example is a second antenna 12_2 in the network entity 80, 80_1) using the measured ARID information 30 of the first antenna 12_1 of the UE 10_1. A network entity 80, 80_2 comprises means for obtaining or determining ARID information of the reference antenna second antenna 12 which in this example is a second antenna 12_2 in the network entity 80, 80_1.

The network entity 80, 80_1 compensates the distance-dependent value (network transfer time) using the received ARID 30 of the first antenna 12_1 of the UE 10_1 and the determined ARID of the reference antenna which in this example is the second antenna 12 of the network entity 80, 80_1. In some examples, the network entity 80 is a UE. In some examples, the network entity 80_1 is a base station in other examples the network entity 80_1 is a user equipment.

In FIG. 8A, the second UE 80 comprises means 220 for determining a distance-dependent value 32 (e.g. a network transfer time between the first antenna 12_1 in the first UE 10_1 and second antenna 12_2 in the second UE 80), and compensating the distance-dependent value (network transfer time) using the received ARID 30 of the first antenna 12_1 of the UE 10_1 and the determined ARID of the second antenna 12 of the second UE 80.

In FIG. 8C, the network entity 80_2 comprises means 220 for determining a distance-dependent value 32 (e.g., a network transfer time between the first antenna 12_1 in the first UE 10_1 and second antenna 12_2 in the network entity 80), and compensating the distance-dependent value (network transfer time) using the received ARID 30 of the first antenna 12_1 of the UE 10_1 and a received ARID 30 of the second antenna 12 of the second UE 80.

Referring to FIG. 8B, in some examples the network entity 80 is user equipment (UE). In some examples, the user equipment (UE) 80 comprises:

means for receiving an antenna resonance induced delay (ARID) 30 of a first antenna 12_1 of another user equipment (UE) 10_1;

means for compensating a (network) transfer time or distance between an antenna 12 in the UE 80 and an antenna 12 in the other UE 10_1 using the ARID 30 of the antenna 12_1 of the other UE 10_1 and an ARID of the antenna 12 of the UE 80, wherein the (network) transfer time is a difference between a transmission time and a reception time of a signal sent between the antenna 12 of the UE 80 and the antenna 12 of the other UE 10_1, and wherein ARID of an antenna is a time it takes an applied signal to leave the antenna and depends upon a complex impedance of the antenna.

In at least some examples, the UE 80 is configured to use the compensated (network) transfer time or distance between the antenna in the UE 80 and the antenna 12 in the other UE 10_1 to position the UE 80 relative to the other UE 10_1 or vice versa.

Figure 8D:
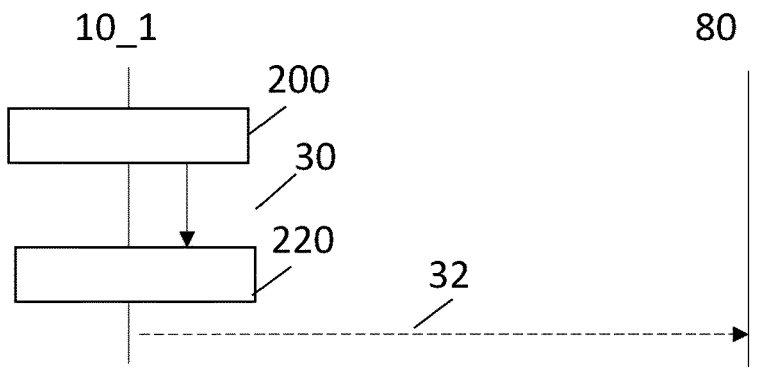
FIG. 8D shows another example of the subject matter described herein.

In the example illustrated in FIG. 8D, the UE 10_1 comprises:

means for determining a distance-dependent value dependent upon a (network) transfer time from an antenna 12 in another user equipment (UE) 80 to a first antenna 12_1 in the UE 10_1;

means for estimating an ARID of the first antenna 12_1 of the UE 10_1;

means for compensating the distance-dependent value dependent upon a transfer time from the antenna 12 in the other UE 80 to the first antenna 12_1 in the UE 10_1 using the measured ARID of the first antenna 12_1 of the UE.

Optionally, the UE 10_1 comprises means for transmitting the compensated distance-dependent value 32 or a parameter indicative of the compensated distance-dependent value from the UE 10_1 to a network entity 80, 80_2.

In the above examples, the network entity 80, 80_1, 80_2 can in some examples receive an ARID 30 of one of more further antennas of the UE 10_1.

In some examples, the network entity 80, 80_2 is configured to compensate a network transfer time or distance between the antenna 12_1 in the network entity 80, 80_1 and the antenna 12_1 in the UE 10_1 using the received ARID of the antenna 12_1 of the UE 10_1 and the ARID of the antenna 12_1 of the network entity 80, 80_1.

In some examples, the network entity 80, 80_2 is configured to compensate a network transfer time or distance between a further antenna 12_2 in the network entity 80, and the antenna 12_1 in the UE 10_1 using the received ARID 30 of the antenna 12_1 of the UE 10_1 and the ARID of the further antenna 12_2 of the network entity 80, 80_1.

In some examples, the network entity 80, 80_2 is configured to compensate a network transfer time or distance between the antenna 12_1 in the network entity 80, 80_1 and a further antenna 12_2 in the UE 10_1 using the received ARID 30 of the further antenna 12_2 of the UE 10_1 and the ARID of the antenna 12_1 of the network entity 80_1.

In some examples, the network entity 80, 80_2 is configured to compensate a network transfer time or distance between the further antenna 12_2 in the network entity 80 and a further antenna 12_2 in the UE 10_1 using the received ARID 30 of the further antenna 12_2 of the UE 10_1 and the ARID of the further antenna 12_2 of the network entity 80, 80_1.

In general, the network entity 10_1, 80, 80_2 is configured to compensate a network transfer time or distance between a network reference antenna 12_j (for example in the network entity 80) and an antenna 12_i in the UE 10_1 using the ARID of the antenna 12_i of the UE 10_1 and the ARID of the reference antenna 12_j.

The network entity 10_1, 80, 80_1 can, for example, be configured to use the compensated transfer time or distance between one or more network reference antennas and one or more antennas in the UE 10_1 to estimate the distance between the respective reference antennas and the respective one or more antennas in the UE to position the UE 10_1 relative to the reference antennas 12_j or vice versa.

It should be appreciated that a single entity can perform any of the roles or any combination of the roles described in relation to FIGS. 8A, 8B, 8C, 8D.

FIG. 9A, 9B, 10 illustrate different arrangements for communication between at least two UEs 10_1, 10_2.

In these examples a central UE (UEc) communicate with one or more peripheral UE (UE). The term 'central' is used to indicate that the central UE (UEc) is a master or querying device that communicates to one or more slave or queried devices. It does not imply a particular physical arrangement. The term 'peripheral' is used to indicate that the peripheral device is a slave or queried device. It does not imply a particular physical arrangement. The term 'central' can be replaced by 'querying' and the term 'peripheral' can be replaced with 'queried' without any addition of information.

In FIG. 9A, a central UE (UEc) communicates with one or more peripheral UE (UE). In FIG. 9B, a network entity 80 (gNB) communicates with one or more peripheral UEs (UE) 10_1 via a central UE (UEc) 10_2. In FIG. 9C, a central UE (UEc) 10_2 communicates with multiple peripheral UEs (UE) 10_1A, 10_1B, 10_1B or with multiple antennas of a peripheral UE 10_1.

The extension illustrated in FIG. 10 to multiple peripheral UEs (multiple antennas) can also be made to FIGS. 9A and 9B at the UE 10_1. The extension to multiple antennas can also be made to FIGS. 9A and 9B at the UE 10_2.

The examples illustrated in FIGS. 9A, 9B, 10 can be combined with the methods illustrated in FIGS. 8A, 8B, 8C, 8D. In some examples, the communication from the UEc to the peripheral UE triggers the peripheral UE to perform one of the methods illustrated in FIGS. 8A, 8B, 8C, 8D. In some examples, the communication from the UEc to the peripheral UE selects which one of the methods illustrated in FIGS. 8A, 8B, 8C, 8D is performed by the peripheral UE.

In the examples of FIG. 9A, 9B, 10, a radio communication apparatus 10_2, 80 (e.g. UE or gNB) comprises:

means for requesting 32, directly or indirectly, a user equipment 10_1 to provide antenna resonance induced delay (ARID) information 30 for one or more antennas of the UE 10_1;

means for receiving in reply:

an ARID 30 of at least one antenna of the UE, or information 30 dependent upon an ARID of at least one antenna of the UE 10_1, wherein the ARID of an antenna is a time it takes an applied signal to leave the antenna 12 and depends upon a complex impedance of the antenna 12.

In FIG. 9A, UE 10_2 comprises:

means for requesting, directly, a user equipment 10_1 to provide antenna resonance induced delay (ARID) information 30 for one or more antennas of the UE 10_1;

means for receiving in reply: an ARID 30 of at least one antenna of the UE, or information 30 dependent upon an ARID of at least one antenna of the UE 10_1, wherein the ARID of an antenna is a time it takes an applied signal to leave the antenna and depends upon a complex impedance of the antenna.

In FIG. 9B, the network entity 80 (e.g. gNB) comprises:

means for requesting, indirectly via the UE 10_2 (UEc), a user equipment 10_1 to provide antenna resonance induced delay (ARID) information 30 for one or more antennas of the UE 10_1;

means for receiving (directly or indirectly) in reply: an ARID 30 of at least one antenna of the UE, or information 30 dependent upon an ARID of at least one antenna of the UE 10_1, wherein the ARID of an antenna is a time it takes an applied signal to leave the antenna and depends upon a complex impedance of the antenna.

The peripheral UE 10_1 comprises:

means for receiving a request 32 to provide antenna resonance induced delay (ARID) information 30 for one or more antennas;

means for providing, in reply to the request 32, an ARID 30 of at least one antenna of the UE, or information 30 dependent upon an ARID of at least one antenna of the UE, wherein the ARID of an antenna 12 is a time it takes an applied signal 20 to leave the antenna and depends upon a complex impedance of the antenna.

The reply can comprise an ARID for a single antenna of ARIDs for multiple different antennas.

As previously described, in at least some examples, the UE 10_1 comprises means for calculating an ARID of at least one antenna of the UE.

For example, the user equipment 10_1 can comprise a first antenna 12_1 and a second antenna 12_2; and means for obtaining a total delay error $\tau_T$ that when added to a reference time $T_{ref}$ equivalent to a reference distance between the first antenna 12_1 and the second antenna 12_2 equals a difference $\Delta$ between a transmission time (t1) of a signal 20 sent via the first antenna 12_1 and a reception time (t2) of the signal 20 received via the second antenna 12_2;

means for measuring a frequency-variable first delay $R_1$ associated with reflection of a transmitted signal 22A by a frequency-variable complex impedance $Z_1$ of the first antenna 12_1;

means for measuring a frequency-variable second delay $R_2$ associated with reflection of a transmitted signal 22B by a frequency-variable complex impedance $Z_2$ of the second antenna 12_2;

means for estimating a first portion $\tau_1$ of the total delay error $\tau_T$ associated with the first antenna 12_1 in dependence upon at least the first delay $R_1$ to calculate an ARID for the first antenna 12_1 or information dependent upon the ARID for the first antenna 12_1; and means for estimating a second portion $\tau_2$ of the total delay error $\tau_T$ associated with the second antenna 12_2 in dependence upon at least the second delay $R_2$ to calculate an ARID for the second antenna 12_2 or information dependent upon the ARID for the second antenna 12_2.

A user equipment can be configured to operate as a central UE or a peripheral UE depending on circumstances.

In FIG. 10, the labels 10_1A, 10_1B, 10_C can refer to distinct user equipment 10_1 or can refer to distinct antenna of a user equipment 10_1.

In some examples, the central user equipment UEc 10_2 is configured to communicate with a peripheral UE 10_1 to determine the number of antennas at the peripheral UE 10_1 and is configured, for each one of the antennas A, B, C at the peripheral UE 10_1, to send a positioning signal from an antenna of the central UE 10_2 to the antenna of the peripheral UE 10_1 and receive from the peripheral UE an ARID 30 of the respective antenna of the peripheral UE 10_1 and a distance-dependent value dependent upon a transfer time of the positioning signal from the antenna 12 in the central UE 10_2 to the respective antenna of the peripheral UE 10_1.

In some examples, the central user equipment UEc 10_2 is configured to communicate with the peripheral UE 10_2 to determine the number of antennas at the peripheral UE 10_2 and configured, for each different combination of one of the antennas of the central UE 10_2 (referred to as the combination antenna of the central UE), and one of the antennas at the peripheral UE 10_1 (referred to as the combination antenna of the peripheral UE):

send a positioning signal from the combination antenna of the central UE 10_2 to the combination antenna of the peripheral UE 10_1 and receive from the peripheral UE 19_1 an ARID 30 of the combination antenna of the peripheral UE 10_1 and a distance-dependent value dependent upon a transfer time of the positioning signal from the combination antenna in the central UE 10_2 to the combination antenna of the peripheral UE 10_1

In some examples, the central UE 10_2 is configured to communicate with the peripheral UE to determine the number of antennas at the peripheral UE 10_1 and inform the peripheral UE 10_1 of the number of antennas at the first UE.

The communications between the central UE 10_2 and the one or more peripheral UEs 10_1 enables accurate relative positioning of the antennas of the respective UEs 10_1, 10_2. This in turn enables accurate relative positioning of the UEs relative to each other.

In some examples, the accurate relative position of antennas of the UEs can be used to create a beam-forming array that uses the antennas of different UEs. For example, the central UE 10_2 can be configured to calculate a relative phase setting at the peripheral UE to enable beam-forming using simultaneously one or more antennas of the central UE 10_2 and one or more antennas of the peripheral UE 10_1. This may be used for increasing effective antenna gain.

Instead of receiving from the peripheral UE 10_1 a ARID 30 of the combination antenna of the peripheral UE 10_1 and a distance-dependent value dependent upon a transfer time of the positioning signal from the combination antenna in the central UE 10_2 to the combination antenna of the peripheral UE 10_1, the central UE 10_2 can receive distance-dependent values dependent upon a transfer time between different combinations of an antenna of the first UE and an antenna of the second UE and dependent upon calculated ARID of the antenna of the first UE and the communicated ARID of the antenna of the second UE.

Thus, user equipment (UE) can comprise:

means for requesting another user equipment to provide antenna resonance induced delay (ARID) information for one or more antennas of the other UE;

means for receiving in reply:

a calculated ARID of at least one antenna of the other UE, or information dependent upon a calculated ARID of at least one antenna of the other UE.

There follows a description of a procedure to derive inter-device spacing for devices utilized in an array configuration for enhanced coverage.

Random-access procedures in New Radio (NR) Release 15 (and beyond) have been specified to be compliant with the beam-based architecture underlying physical layer (PHY) operations in 5G networks. Two random-access channel (RACH) procedures exist, contention-free (CFRA) and contention based (CBRA). The latter can be in 2 and 4 steps, where a message exchange occurs between UE and gNB in each of the steps.

The 4-step version comprises Msg1 (uplink), Msg2 (downlink), Msg3 (uplink) Msg4 (downlink).

One cause for a random-access failure is that the gNB is not able to receive and successfully decode uplink messages e.g., msg3 transmitted from a connecting UE. This issue directly affects the cell size or, equivalently, the physical limit at which a UE will be able to connect to a given gNB.

Gain can be increased by using high gain directional beams, however, not all UEs have an antenna array capable of high-gain beam steering. However, several UEs can be configured to cooperate to increase transmit power by forming, together, a beam-forming array. This could be used when increased antenna gain performance is required, for example, E911 calls in remote locations with poor cellular coverage.

Setting up an antenna array configuration of several individual UEs requires accurate positioning of the antennas of the UEs. The required phase shift between two antenna array elements to form a beam in a given angular direction depends on the spacing between them, for different wavelength between the elements.

When using individual UEs to form the antenna array, they can be placed in an ad hoc fashion by the user. As such, knowing the individual and non-uniform spacings between UEs in an antenna array configuration is important to ensure an optimal beam.

The SRS sweeping procedure when no inter-device spacing is known will require more configured beams to make sure the full angular space is covered but less beams are needed when the inter-device distances are known.

The achieved antenna gain is also higher when the inter-device distance is known for example up to 50% compared to the configuration with unknown inter-device spacings.

The UE's forming the antenna array will automatically determine the inter-device (element) distances and optimize the beam sweeping procedure in terms of available antenna gain and needed codebook entries.

Antenna resonance induced delay (ARID) e.g. $\Sigma_n$, n=1, 2 can be defined for each antenna on the device used for centimeter positioning accuracy or any other application where the distance between two devices needs to be estimated.

Handheld devices compliant with 3GPP will have to support 2×2 downlink MiMo for frequency bands below 1 GHz and 4×4 downlink MiMo for frequency bands above 1 GHz. As such, the procedure for multiple devices to form a device array like configuration to enhance coverage at low band frequencies within FR1, will most likely transmit and receive data signals at low band (like 725 MHz as the example), but could use the higher frequencies (like for example 3.5 GHz) for estimating the inter device distances. The advantages of using higher frequencies for the inter device distance estimations is the shorter wavelength and twice the number of antennas (4 instead of 2).

A Phase Center Offset (PCO) variation of the radiation patterns is dependent on the angular direction of the propagation path between the individual antennas and can affect the delay result with more than ±wavelength for some angular directions. As such, in some circumstances, this additional delay error contribution ($\tau_{PCO}$) is removed together with the antenna induced resonance delay error ($\tau_n$), for accurate inter device distance estimation.

The communication of error delay compensation values $\tau_n$ between devices is enabled.

The PCO variation error can be minimized by performing inter device delay measurements between all the high band antennas on the devices. The minimization of TPCO error delays occurs by utilization of all available antenna pairs between the two devices, to average out delay error caused by the PCO variation of antennas.

Figure 11:
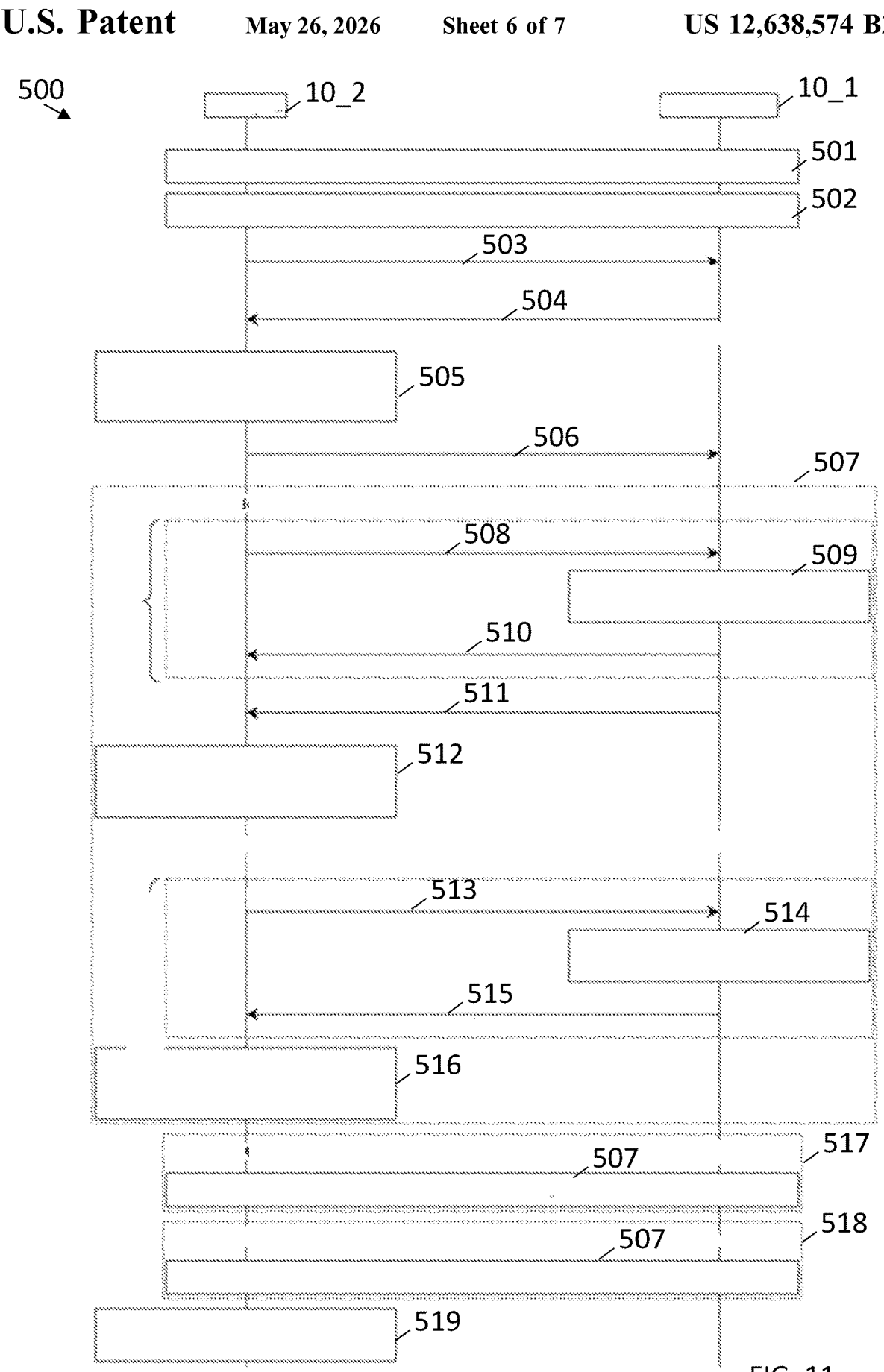
FIG. 11 shows another example of the subject matter described herein.

The inter device calibration procedure needed for eliminating the delay error contributions from $\tau_{PCO}$ and $\tau_n$ is shown in FIG. 11 and can be realized using the already 3GPP specified UE to UE legacy interface (Sidelink, Bluetooth, WiFi, etc.).

Step 501: A legacy connection is established between the leading UE 10_2 and a first connected UE 10_1. This could be Sidelink, Bluetooth, WiFi, etc.

Step 502: A legacy Device Array configuration is established between the involved UE's.

Step 503: The Leading UE 10_2 inquires if the first Supporting UE 10_1 supports $\tau_{PCO}$ and $\tau_n$ delay error compensation.

Step 504: The first Support UE 10_1 informs the leading UE 10_2 about its capabilities for $\tau_{PCO}$ and $\tau_n$ delay error compensation. This includes the number of available antennas and whether the Supporting UE 10_1 informs the Leading UE 10_2 of the $\tau_n$ error delay compensation values or apply them autonomously to the reported legacy RTT values.

Step 505: The Leading UE 10_2 allocates the required number of position reference signals based on number of supported antennas.

Step 506: The Leading UE 10_2 informs the first Supporting UE 10_1 which antenna to use for the allocated positioning reference signals.

Step 507: PCO delay error compensation procedure for the first antenna on the first Support UE.

Step 508: Leading UE 10_2 transmits a first positioning reference signal with a first antenna.

Step 509: First Support UE 10_1 receives the first positioning reference signal with a first antenna.

Step 510: First Support UE 10_1 replies to the first positioning reference signal with a first antenna including legacy RTT information.

Step 511: First Support UE 10_1 informs the Leading UE 10_2 of the $\tau_n$ error delay compensation value for the first antenna.

Step 512: Leading UE 10_2 calculates RTT values including $\tau_n$ error delay compensation values for both antennas (First antenna at the leading UE 10_2 and the first antenna at the first supporting UE 10_1).

Step 513: Leading UE 10_2 transmit a $n^{th}$ positioning reference signal with a $n^{th}$ antenna.

Step 514: First Support UE receives the $n^{th}$ positioning reference signal with a first antenna.

Step 515: First Support UE replies to the $n^{th}$ positioning reference signal with a first antenna including legacy RTT information.

Step 516: Leading UE 10_2 calculates RTT values including $\tau_n$ error delay compensation values for both antennas ($n^{th}$ antenna at the leading UE 10_2 and the first antenna at the first supporting UE).

Step 517: PCO delay error compensation procedure for the second antenna on the first Support UE 10_1.

Step 518: PCO delay error compensation procedure for the $p^{th}$ antenna on the first Support UE 10_1.

Step 519: Leading UE 10_2 can now estimate the distance between the two UE's 10_1, 10_2 including for $\tau_{PCO}$ and $\tau_n$ delay error compensation values.

The above-described procedure is performed between the leading UE and all the supporting UEs.

There follows a description of a procedure for Adaptive Device calibration of antenna resonance induced delay offsets for devices with advanced timing accuracy.

A device is configured to estimate and correct for antenna resonance induced delay values, when high timing accuracy is needed (for example centimeter positioning accuracy). These error values will change dynamically as the environment changes around the device and its antennas. As such, an adaptive procedure at the device is used to compensate for these error values.

A first step of the procedure is to measure the delays between the individual antennas on the device and compare those to the known physical distance between the individual antennas on the device.

A second step is to measure the delays of the reflected signal at each of the antennas, to derive a valid ratio (called Reflected Delay ratio (RDr)) between two antennas. The RDr combined with the values from the first step can then be used to derive the delay errors induced by the resonance of each the antenna on the device.

High timing accuracy is needed for any devices where centimeter positioning accuracy is required, since 1 cm is equal to 33 ps transfer time. The Timing Error Group (TEG) parameter in 3GPP is intended to contain all relevant components that will introduce timing errors relevant for centimeter position accuracy.

Transmission (Tx) timing error: From a signal transmission perspective, there will be a time delay from the time when the digital signal is generated at baseband to the time when the radio frequency (RF) signal is transmitted from the Tx antenna. For supporting positioning, the UE/TRP may implement an internal calibration/compensation of the Tx time delay for the transmission of the downlink (DL) PRS/uplink (UL) SRS signals, which may also include the calibration/compensation of the relative time delay between different RF chains in the same TRP/UE. The compensation may also possibly consider the offset of the Tx antenna phase center to the physical antenna center. However, the calibration may not be perfect. The remaining Tx time delay after the calibration, or the uncalibrated Tx time delay is defined as Tx timing error.

Reception (Rx) timing error: From a signal reception perspective, there will be a time delay from the time when the RF signal arrives at the Rx antenna to the time when the signal is digitized and time-stamped at the baseband. For supporting positioning, the UE/TRP may implement an internal calibration/compensation of the Rx time delay before it reports the measurements that are obtained from the DL PRS/UL SRS signals, which may also include the calibration/compensation of the relative time delay between different RF chains in the same TRP/UE. The compensation may also possibly consider the offset of the Rx antenna phase center to the physical antenna center. However, the calibration may not be perfect. The remaining Rx time delay after the calibration, or the uncalibrated Rx time delay is defined as Rx timing error.

So far, none of the discussed TEG components has dealt with the added delay coming from the resonance of the antenna itself. This delay is not static and will depend on the current complex impedance and Q-factor of the antenna, which will change as the environmental conditions around the antenna changes. This can be due to dynamic user interactions or even semi-static cases like physical placements of the device on different types of materials, like in a pocket, in a bag, on a table, etc. The error added due to the resonance of the antenna can be in the order of 1 ns, which translates to a position accuracy of 33 cm, clearly a factor that need to be dealt with if accuracies in the centimeter range are needed.

The following paragraphs will focus on the adaptive internal calibration procedure on the device to compensate for the delay added by the resonance of the antenna. The compensated delay value can be added to the TEG parameter defined in 3GPP for centimeter positioning accuracy.

None of the TEG components discussed in 3GPP so far has mentioned the resonance of the antenna as a timing error source.

The basic concept of this adaptive internal calibration procedure to estimate the added Antenna resonance delay for each of the antennas, is to perform internal coupling measurements between the antennas.

The delays for each coupling measurement can be derived and compared to the known physical distance between the individual antennas on the used reference device.

It is important that the coupling between two antennas is sufficiently high to ensure that the derived delay is the direct coupling path and not a combination of random reflected paths.

Where mutual couplings are very low, they are not used. This could also be verified by performing a Power Delay Profile (PDP) conversion of the measured mutual coupled signals. e.g. low coupling between antennas results in absolute delay values that are too high compared to the expected values as a function of the physical distances.

There is a delay contribution from the resonance of the antennas themselves (the resonance of an antenna can be equivalated with a parallel resonator). As such, this delay contribution will depend on the complex impedance value for the antenna at the given frequency, whereby these values will change dynamically and must be adaptively updated.

The steps for estimating the individual antenna resonance induced delay (ARID) compensation values are:

The following four equations can be derived:

$$\text{Physical distance } T_{ref(i,j)} + \tau_{i(i,j)} + \tau_{j(i,j)} = \tau_{T(i,j)}$$

For pairing of antennas $12\_i$ and $12\_j$, the combination (i, j): $T_{ref} + \tau_i + \tau_j = \tau_T$ where $T_{ref}$ represents the known physical distance between the antennas $12\_i$ and $12\_j$, $\tau_T$ represents the measured time of flight (transfer time) between the antennas $12\_i$ and $12\_j$ and $\tau_i$ represents the unknown ARID for antenna $12\_1$ and $\tau_j$ represents the unknown ARID for antenna $12\_j$.

In a UE with 4 antennas, the possible antenna pair combinations are (1,2), (1, 3), (1, 4), (2, 3), (2, 4), (3, 4). If (1, 3) & (2, 4) are disregarded because of poor coupling, the remaining combinations are (1,2), (1, 4), (2, 3), (3, 4). This results in four equations but without a unique solution so estimation is performed.

The first step in this estimation procedure is to measure the delay of the reflected signal.

The simulated or measured delays $R_i$, $R_j$ of the reflected signal at each of the antennas $10\_i$, $10\_j$, is used to derive a valid ratio (called Reflected Delay ratio (RDr)) between two antennas. RDr can be interpreted as a weight that determines how the total delay error $(\tau_T - T_{ref})$ is relatively distributed between the two antenna ports.

$$\text{For combination } (i,j) RDr(i) = R_i / R_i + R_j \ \& \ RDr(j) = R_j / R_i + R_j$$

$$\tau_i = RDr(i) * \tau_T$$

$$\tau_j = RDr(j) * \tau_T$$

The RDr's can be calculated for all known antenna combinations and an approximated averaged error delay can be derived for each antenna, for example, by averaging antenna resonance induced delay values.

This concept will be valid/useful for only two antennas, but more accurate with more antennas. Devices with few antennas could use different frequency ranges for improved accuracy.

This delay correction factor is dynamic for handheld devices and the delay error contributions are significant for centimeter accuracy.

Both the Q of the antennas and the complex impedance match of the antennas will affect the error contributions, whereby it is adaptively corrected especially for handheld devices.

FIG. 12 illustrates a method 600 that can be adaptively activated when centimeter accuracy is required.

Step 601: Obtain the physical distance between the antennas. This may have been a one-time measurement stored on the device. The physical distance can be obtained, for example, by measurement, by reception of data or by reading of data from a memory.

Step 602: measure the mutual coupling between antennas of the device under current conditions of the device.

Step 603: determine which couplings are valid for antenna error delay estimation.

Step 604: measure the reflection coupling delays of the valid antenna sets under the current conditions of the device.

Step 605: calculate the scaling factors RDr of each antenna set.

Step 606: estimate the error delay for each antenna.

Thus, measured antenna port reflection delay on devices with multiple antennas is used to correct measured delay between the antennas.

This enables centimeter positioning accuracy for handheld devices.

FIG. 13 illustrates an example of a controller 400 suitable for use in an apparatus 100. Implementation of a controller 400 may be as controller circuitry. The controller 400 may be implemented in hardware alone, have certain aspects in software including firmware alone or can be a combination of hardware and software (including firmware).

As illustrated in FIG. 13 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 100 when loaded into the processor 402. The computer program instructions, of the computer program 406, provide the logic and routines that enables the apparatus to perform the methods illustrated in the FIGS. The processor 402 by reading the memory 404 is able to load and execute the computer program 406.

The apparatus 100 therefore comprises:

at least one processor 402; and at least one memory 404 including computer program code the at least one memory 404 and the computer program code configured to, with the at least one processor 402, cause the apparatus 100 at least to perform:

obtaining a total delay error $\tau_T$ that when added to a reference time $T_{ref}$ equivalent to a reference distance between a first antenna 12_1 and a second antenna 12_2 equals a difference between a transmission time (t1) of a signal 20 sent via the first antenna 12_1 and a reception time (t2) of the signal 20 received via the second antenna 12_2;

measuring a frequency-variable first delay $R_1$ associated with reflection of a transmitted signal 22A by a frequency-variable complex impedance $Z_1$ of the first antenna 12_1;

measuring a frequency-variable second delay $R_2$ associated with reflection of a transmitted signal 22B by a frequency-variable complex impedance $Z_2$ of the second antenna 12_2;

estimating a first portion $\tau_1$ of the total delay error $\tau_T$ associated with the first antenna 12_1 in dependence upon at least the first delay;

estimating a second portion $\tau_2$ of the total delay error $\tau_T$ associated with the second antenna 12_2 in dependence upon at least the second delay.

As illustrated in FIG. 14, the computer program 406 may arrive at the apparatus 100 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 406. The delivery mechanism may be a signal configured to reliably transfer the computer program 406. The apparatus 100 may propagate or transmit the computer program 406 as a computer data signal.

Computer program instructions for causing an apparatus to perform at least the following or for performing at least the following:

obtaining a total delay error $\tau_T$ that when added to a reference time $T_{ref}$ equivalent to a reference distance between a first antenna 12_1 and a second antenna 12_2 equals a difference between a transmission time (t1) of a signal 20 sent via the first antenna 12_1 and a reception time (t2) of the signal 20 received via the second antenna 12_2;

measuring a frequency-variable first delay $R_1$ associated with reflection of a transmitted signal 22A by a frequency-variable complex impedance $Z_1$ of the first antenna 12_1;

measuring a frequency-variable second delay $R_2$ associated with reflection of a transmitted signal 22B by a frequency-variable complex impedance $Z_2$ of the second antenna 12_2;

estimating a first portion $\tau_1$ of the total delay error $\tau_T$ associated with the first antenna 12_1 in dependence upon at least the first delay;

estimating a second portion $\tau_2$ of the total delay error $\tau_T$ associated with the second antenna 12_2 in dependence upon at least the second delay.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. A UE can be a module.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A user equipment comprising:

at least one processor; and at least one memory including computer program code, the at least one memory and the computer program code configured to, with the at least one processor, cause the apparatus at least to perform:

determining a total delay error that when added to a reference time equivalent to a reference distance between a first antenna and a second antenna equals a difference between a transmission time of a signal sent via the first antenna and a reception time of the signal received via the second antenna;

measuring a frequency-variable first delay associated with reflection of a transmitted signal by a frequency-variable complex impedance of the first antenna;

measuring a frequency-variable second delay associated with reflection of a transmitted signal by a frequency-variable complex impedance of the second antenna;

estimating a first portion of the total delay error associated with the first antenna in dependence upon at least the first delay;

estimating a second portion of the total delay error associated with the second antenna in dependence upon at least the second delay; and adjusting, at the user equipment, a transmission timing and a reception timing based on the first portion of the total delay error and the second portion of the total delay error.

2. An apparatus as claimed in claim 1, wherein the at least one memory and the computer program code are further configured to, with the at least one processor, cause the apparatus to use the first portion of the total delay error associated with the first antenna to enable a reduction of at least a transmission timing error for transmission via the first antenna.

3. An apparatus as claimed in claim 1, wherein the at least one memory and the computer program code are further configured to, with the at least one processor, cause the apparatus to use the second portion of the total delay error associated with the second antenna to enable a reduction of at least a reception timing error for reception via the second antenna.

4. An apparatus as claimed in claim 1, wherein the at least one memory and the computer program code are further configured to, with the at least one processor, cause the apparatus to use the first portion of the total delay error associated with the first antenna to enable a reduction of reception timing error for reception via the first antenna and to use the second portion of the total delay error associated with the second antenna to enable a reduction of a transmission timing error for transmission via the second antenna.

5. An apparatus as claimed in claim 1, further comprising the first antenna and the second antenna.

6. An apparatus as claimed in claim 1, wherein the at least one memory and the computer program code are configured to, with the at least one processor, cause the apparatus to:

measure the frequency-variable first delay as a first delay between a time that represents a transmission time of a signal sent via the first antenna and a time that represents a reception time of the signal reflected by the first antenna; and measure the frequency-variable second delay as a second delay between a time that represents a transmission time of a signal sent via the second antenna and a time that represents a reception time of the signal reflected by the second antenna.

7. An apparatus as claimed in claim 1, wherein the at least one memory and the computer program code are configured to, with the at least one processor, cause the apparatus to:

estimate the first portion of the total delay error associated with the first antenna by applying a first scaling factor to the total delay error, wherein the first scaling factor is dependent on the first delay associated with the first antenna and the second delay associated with the second antenna; and estimate the second portion of the total delay error associated with the second antenna by applying a second scaling factor to the total delay error, wherein the second scaling factor is dependent on the first delay associated with the first antenna and the second delay associated with the second antenna.

8. An apparatus as claimed in claim 1, wherein the at least one memory and the computer program code are configured to, with the at least one processor, cause the apparatus to:

estimate the first portion of the total delay error associated with the first antenna by multiplying the first delay by a scaling factor; and estimate the second portion of the total delay error associated with the second antenna by multiplying the second delay by the scaling factor.

9. An apparatus as claimed in claim 1, wherein the at least one memory and the computer program code are configured to, with the at least one processor, cause the apparatus to:

estimate the first portion of total delay error associated with the first antenna and the second portion of the total delay error by constraining a sum of first portion of the total delay error associated with the first antenna and the second portion of the total delay error to equal the total delay error.

10. An apparatus as claimed in claim 1, wherein the at least one memory and the computer program code are configured to, with the at least one processor, cause the apparatus to:

estimate the first portion of the total delay error as the total delay error multiplied by the first delay and divided by a sum of the first delay and the second delay; and estimate the second portion of the total delay error as the total delay error multiplied by the second delay and divided by a sum of the first delay and the second delay.

11. An apparatus as claimed in claim 1, wherein the at least one memory and the computer program code are further configured to, with the at least one processor, cause the apparatus to:

transmit, to another network entity, the first portion and/or the second portion of the total delay error between the first antenna and second antenna or transmit, to another network entity, one or more values determined using the first portion and/or the second portion of the total delay error between the first antenna and second antenna.

12. An apparatus as claimed in claim 1, wherein the at least one memory and the computer program code are further configured to, with the at least one processor, cause the apparatus to measure, for a set of multiple different pairs of antennas in the apparatus, a total delay error between a first time that represents a transmission time of a signal sent via a first antenna of a pair of antennas and a second time that represents a reception time of the signal at a second antenna of the pair of antennas by:

subtracting, from a time difference between the first time and the second time, a time representing a reference distance between the first antenna and the second antenna of the pair of antennas;

measuring a frequency-variable first delay associated with reflection of a transmitted signal by a frequency-variable complex impedance of the first antenna of the pair of antennas;

measuring a frequency-variable second delay associated with reflection of a transmitted signal by a frequency-variable complex impedance of the second antenna of the pair of antennas;

estimating a first portion of the total delay error associated with the first antenna of the pair of antennas in dependence upon at least the first delay; and estimating a second portion of the total delay error associated with the second antenna of the pair of antennas in dependence upon at least the second delay, wherein the set of multiple different pairs of antennas in the apparatus is a sub-set of all the possible different pairs of antennas in the apparatus, wherein measurements indicate a direct transmission path exists between the pairs of antennas in the set and a direct transmission path does not exist between the pairs of antennas not in the set.

13. A method comprising:

determining a total delay error that when added to a reference time equivalent to a reference distance between a first antenna and a second antenna equals a difference between a transmission time of a signal sent via the first antenna and a reception time of the signal received via the second antenna;

measuring a frequency-variable first delay associated with reflection of a transmitted signal by a frequency-variable complex impedance of the first antenna;

measuring a frequency-variable second delay associated with reflection of a transmitted signal by a frequency-variable complex impedance of the second antenna;

estimating a first portion of the total delay error associated with the first antenna in dependence upon at least the first delay;

estimating a second portion of the total delay error associated with the second antenna in dependence upon at least the second delay; and adjusting, at a user equipment, a transmission timing and a reception timing based on the first portion of the total delay error and the second portion of the total delay error.

14. A method comprising:

repeating the method of claim 13 for different combinations of first and second antennas and/or at different frequencies to obtain a sample comprising multiple estimates of portions of total delay error ($\tau_T$) associated with an antenna and using the sample to estimate the portion of a total delay error expected to be associated with the antenna.

15. A method as claimed in claim 13, further comprising using the first portion of the total delay error associated with the first antenna to enable a reduction of at least a transmission timing error for transmission via the first antenna.

16. A method as claimed in claim 13 further comprising using the second portion of the total delay error associated with the second antenna to enable a reduction of at least a reception timing error for reception via the second antenna.

17. A method as claimed in claim 13, further comprising:

using the first portion of the total delay error associated with the first antenna to enable a reduction of reception timing error for reception via the first antenna; and using the second portion of the total delay error associated with the second antenna to enable a reduction of a transmission timing error for transmission via the second antenna.

18. A method as claimed in claim 13, wherein the frequency-variable first delay is measured as a first delay between a time that represents a transmission time of a signal sent via the first antenna and a time that represents a reception time of the signal reflected by the first antenna, and wherein-the frequency-variable second delay is measured as a second delay between a time that represents a transmission time of a signal sent via the second antenna and a time that represents a reception time of the signal reflected by the second antenna.

19. A method as claimed in claim 13, wherein estimating the first portion of the total delay error associated with the first antenna comprises applying a first scaling factor to the total delay error, wherein the first scaling factor is dependent on the first delay associated with the first antenna and the second delay associated with the second antenna, and wherein estimating the second portion of the total delay error associated with the second antenna comprises applying a second scaling factor to the total delay error, wherein the second scaling factor is dependent on the first delay associated with the first antenna and the second delay associated with the second antenna.

20. A non-transitory computer-readable storage medium storing a computer program comprising instructions that when run on one or more processors enables:

determining a total delay error that when added to a reference time equivalent to a reference distance between a first antenna and a second antenna equals a difference between a transmission time of a signal sent via the first antenna and a reception time of the signal received via the second antenna;

measuring a frequency-variable first delay associated with reflection of a transmitted signal by a frequency-variable complex impedance of the first antenna;

measuring a frequency-variable second delay associated with reflection of a transmitted signal by a frequency-variable complex impedance of the second antenna;

estimating a first portion of the total delay error associated with the first antenna in dependence upon at least the first delay;

estimating a second portion of the total delay error associated with the second antenna in dependence upon at least the second delay; and adjusting, at a user equipment, a transmission timing and a reception timing based on the first portion of the total delay error and the second portion of the total delay error.

* * * * *